United States Patent [19]
Matsumoto

[11] Patent Number: 5,929,975
[45] Date of Patent: Jul. 27, 1999

[54] METHOD AND APPARATUS FOR EXPOSING PHOTOSENSITIVE MATERIAL

[75] Inventor: Nobuo Matsumoto, Kanagawa, Japan

[73] Assignee: Fuji Photo Film Co., Ltd., Kanagawa, Japan

[21] Appl. No.: 08/648,375

[22] Filed: May 15, 1996

[30] Foreign Application Priority Data

May 17, 1995 [JP] Japan .................................. 7-118631

[51] Int. Cl.⁶ .................................................. G03B 27/44
[52] U.S. Cl. .................................................. 355/46; 355/28
[58] Field of Search ................................ 355/46, 54, 72, 355/27, 28

[56] References Cited

U.S. PATENT DOCUMENTS

| | | | |
|---|---|---|---|
| 5,446,520 | 8/1995 | Todoki | ................................ 355/27 |
| 5,452,050 | 9/1995 | Ishikawa et al. | ........................ 355/27 |

FOREIGN PATENT DOCUMENTS

| | | |
|---|---|---|
| 57-78052 | 10/1955 | Japan . |
| 58-29464 | 6/1983 | Japan ................................ G03D 3/00 |
| 60-107841 | 7/1985 | Japan ................................ G03D 27/46 |
| 6-347905 | 12/1994 | Japan ................................ G03B 27/46 |
| 6-347907 | 12/1994 | Japan ................................ G03B 27/46 |

*Primary Examiner*—Safet Metjahic
*Assistant Examiner*—John Chizmar
*Attorney, Agent, or Firm*—Sughrue, Mion, Zinn, Macpeak & Seas, PLLC

[57] ABSTRACT

A method for exposing a photosensitive material includes the step of transporting a plurality of photosensitive materials at predetermined intervals in a first direction intersecting a transporting direction by a single transporting device; and the step of exposing the plurality of photosensitive materials supported by the single transporting device in an exposure region by a single exposure system, wherein the single exposure system is capable of exposing each piece of image information to be exposed onto each of the plurality of photosensitive materials to a size larger than at least a length of each of the photosensitive materials in the first direction. Accordingly, even if the position of the photosensitive material to be exposed is slightly offset in the first direction, an unexposed portion is not produced in an edge of the photosensitive material in the first direction.

13 Claims, 32 Drawing Sheets

METHOD AND APPARATUS FOR EXPOSING PHOTOSENSITIVE MATERIAL

BACKGROUND OF THE INVENTION

1. Field of the Invention

The present invention relates to a method and an apparatus for exposing photosensitive material as well as a printer processor, and is applicable to a photographic printer.

2. Description of the Related Art

In photofinishing laboratories, there is a demand for high-performance exposing apparatuses (printers) to efficiently deal with large numbers of processing jobs.

To meet such a demand, various exposing apparatuses have been proposed.

For example, Japanese Utility Model Application Publication No. 58-29464 concerns an apparatus in which a photosensitive material cut after exposure is distributed into a plurality of rows. This apparatus has an advantage in that the processor can be made compact, but has the following drawbacks:

(a) A mechanism for distributing the photosensitive material into a plurality of rows (a sorting device) is required.

(b) To obtain high performance, it is necessary to operate the sorting device at high speed, and there is a limit to the effort in obtaining high performance.

(c) To attain high performance, it is necessary to shorten the time of exposure, and it is necessary to reduce the time required in supplying the photosensitive material to an exposure section, the time required in discharging the photosensitive material from the exposure section, and the exposure time.

Japanese Utility Model Application Laid-Open No. 57-78052 discloses an automatic photographic printer for effecting photographic printing by a single exposure system, wherein a plurality of photosensitive-material supplying magazines are provided in an apparatus body, and the paper to be fed from the plurality of photosensitive-material supplying magazines is made changeable, as required.

In this supplying device, since the photosensitive material can be selectively supplied to one exposure system from the plurality of photosensitive-material supplying magazines, a change in the width of the photosensitive material is readily possible. Since the photosensitive material in one magazine is used up, and the photosensitive material can be supplied from another magazine, it is unnecessary to stop the photographic printer. Hence, there is an advantage in that productivity is high.

However, since the photosensitive material which can be exposed simultaneously is only one row, in order to obtain high performance, it is necessary to speed up the transport of the photosensitive material or shorten the exposure time.

Japanese Utility Model Application Laid-Open No. 60-107841 discloses an apparatus wherein the photosensitive material is selectively pulled out from a plurality of magazines, is then cut, and is supplied to an exposure section.

This apparatus is not efficient since the plurality of photosensitive materials are not transported in parallel. In FIG. 2 of Japanese Utility Model Application Laid-Open No. 60-107841, which is illustrated therein as a conventional example, the arrangement is efficient in that one photosensitive material can be transported while the other photosensitive material is being exposed. However, there is a drawback in that, in order to form a greater number of rows or print a wide photosensitive material in a single row, the apparatus becomes large in size.

Japanese Patent Application Laid-Open No. 6-347905 discloses a printer wherein projection exposure devices project and expose film images in correspondence with respective exposing portions in a plurality of juxtaposed photosensitive-material transport passages, and the photosensitive materials subsequent to exposures are individually transported and processed in a plurality of rows.

Since this apparatus has a plurality of projection exposure systems, the structure of the exposure section becomes complex, so that there are drawbacks in that the number of component parts used increases, and the cost becomes high.

Japanese Patent Application Laid-Open No. 6-347907 discloses a printer wherein projection exposure systems project and expose film images in correspondence with respective exposing portions in a plurality of juxtaposed photosensitive-material transport passages.

Since this apparatus has a plurality of projection exposure systems, the structure of the exposure section becomes complex, so that there are drawbacks in that the number of component parts used increases, and the cost becomes high.

SUMMARY OF THE INVENTION

In view of the above-described facts, it is an object of the present invention to provide a a method of exposing a photosensitive material which makes it possible to render an exposure apparatus such as a printer highly efficient and compact, and an apparatus for exposing a photosensitive material which can be made highly efficient and compact.

In accordance with a first aspect of the present invention, there is provided a method for exposing a photosensitive material, comprising the steps of: transporting a plurality of photosensitive materials at predetermined intervals in a first direction intersecting a transporting direction by single transporting means; and exposing the plurality of photosensitive materials supported by the single transporting means in an exposure region by a single exposure system, wherein the single exposure system is capable of exposing each piece of image information to be exposed onto each of the plurality of photosensitive materials to a size larger than at least a length of each of the photosensitive materials in the first direction.

A description will be given of the operation of the method for exposing a photosensitive material in accordance with the first aspect of the present invention.

A plurality of photosensitive materials are transported at predetermined intervals in a first direction intersecting a transporting direction by single transporting means. The plurality of photosensitive materials are exposed by a single exposure system. In addition, the length (width) of each piece of the image information to be exposed is set to a dimension larger than the length (width) of each photosensitive material in the first direction in the exposure region. For this reason, even if the position of the photosensitive material is slightly offset in the widthwise direction, it is possible to prevent a situation in which an unexposed portion (a whitened portion) is produced in a widthwise edge of the photosensitive material, or part of adjacent image information is exposed therein.

In accordance with a second aspect of the present invention, in the method for exposing a photosensitive material according to the first aspect of the present invention, in the exposure step, the first direction is a direction substantially perpendicular to the transporting direction, and the plurality of photosensitive materials are exposed with their trailing ends aligned.

A description will be given of the operation of the method for exposing a photosensitive material in accordance with the second aspect of the present invention.

The plurality of photosensitive materials are exposed with their trailing ends aligned. Even if the lengths of the photosensitive materials are different, since the positions of their trailing ends in the transporting direction are aligned, it is readily possible to sort the photosensitive materials in the order of frame numbers if a sorter is provided on the discharge side of the transporting means so as to transport the photosensitive materials in the first direction (a direction substantially perpendicular to the transporting direction), and if images are exposed in the order of frame numbers, starting from the downstream side of the sorter in the transporting direction.

In accordance with a third aspect of the present invention, in the method for exposing a photosensitive material according to the first aspect of the present invention, the single exposure system is a single scanning exposure system for a main scanning direction in the first direction, and in the exposure step the plurality of photosensitive materials are exposed by the single scanning exposure system which is capable of exposing with a range larger than a range including all the plurality of photosensitive materials in the first direction.

Accordingly, in this third aspect, the plurality of photosensitive materials are exposed at once in the first direction.

In accordance with a fourth aspect of the present invention, in the method for exposing a photosensitive material according to the first aspect of the present invention, the first direction is a direction substantially perpendicular to the transporting direction, and all the plurality of photosensitive materials have identical lengths in the transporting direction, and wherein, in the exposure step, the plurality of photosensitive materials are exposed collectively.

A description will be given of the operation of the method for exposing a photosensitive material in accordance with the fourth aspect of the present invention.

The plurality of photosensitive materials of the same length in a direction along the transporting direction are arranged in parallel, and are collectively exposed. Consequently, when photosensitive materials of a plurality of sizes are processed, intervals between the printing papers in the transporting direction on the whole can be shortened. Hence, it is possible to increase the processing efficiency.

In one form, the plurality of photosensitive materials are elongated photosensitive materials onto which the plurality of pieces of image information are exposed along the transporting direction.

In accordance with a fifth aspect of the present invention, in the method for exposing a photosensitive material according to the first aspect of the present invention, each of the plurality of photosensitive materials arranged in rows include a plurality of second photosensitive materials which are spaced apart from each other, and the plurality of photosensitive materials are transported such that while one photosensitive material among the plurality of photosensitive materials in one row is being exposed in the exposure region, the supply to the exposure region and/or the discharge from the exposure region of at least one photosensitive material among the plurality of photosensitive materials in another row is effected.

A description will be given of the operation of the method for exposing a photosensitive material in accordance with the fifth aspect of the present invention.

In this aspect, in a case where the exposure region of the exposure system (or scanning exposure system) is incapable of covering all the plurality of rows, while one photosensitive material in one row is being exposed, at least one photosensitive material in another row is supplied to or discharged from the exposure region. Incidentally, it is preferable to effect the supply and discharge concurrently, thereby making it possible to attain high efficiency.

In accordance with a sixth aspect of the present invention, there is provided an apparatus for exposing a photosensitive material, comprising: single transporting means capable of transporting a plurality of photosensitive materials at predetermined intervals in parallel; a single exposure system for exposing in an exposure region the plurality of photosensitive materials supported by the single transporting means, the single exposure system being capable of setting a size of each piece of image information to be exposed to a size larger than a size of each of the plurality of photosensitive materials.

A description will be given of the operation of the apparatus for exposing a photosensitive material in accordance with the sixth aspect of the present invention.

The plurality of photosensitive materials are transported at predetermined intervals in parallel by the single transporting means. The plurality of photosensitive materials are exposed by a single exposure system. Here, the size of each piece of image information to be exposed is set to a size larger than at least the size of each of the plurality of photosensitive materials in the exposure region. For this reason, even if the position of the photosensitive material is slightly offset in the widthwise direction (in a direction intersecting the transporting direction) or in the transporting direction, it is possible to prevent a situation in which an unexposed portion (a whitened portion) is produced in a peripheral portion of the photosensitive material, or part of adjacent image information is exposed therein.

In accordance with a seventh aspect of the present invention, in the apparatus for exposing a photosensitive material according to the sixth aspect of the present invention, the single exposure system is a single scanning exposure system whose main scanning direction is a direction substantially perpendicular to the transporting direction.

Accordingly, in this seventh aspect, the plurality of photosensitive materials are exposed at once in the direction substantially perpendicular to the transporting direction.

In accordance with an eighth aspect of the present invention, in the sixth or seventh aspect, the transporting means is provided with an accumulator having a plurality of guide means which are disposed along transport passages of the plurality of photosensitive materials, the plurality of guide means being capable of being independently operated, respectively, and of making lengths of the transporting passages of the photosensitive materials variable.

A description will be given of the operation of the apparatus for exposing a photosensitive material in accordance with the eighth aspect of the present invention.

For example, in a case where a developing device is disposed downstream of an exposure device as viewed in the transporting direction of the photosensitive material, the accumulator disposed upstream of the developing device as viewed in the transporting direction of the photosensitive material is capable of absorbing a difference in speed between the transporting speed of the photosensitive material on the exposure device side and the transporting speed of the photosensitive material on the developing device side.

Also, in a case where a device for supplying a photosensitive material is disposed upstream of the exposure device as viewed in the transporting direction of the photosensitive material, the accumulator disposed upstream of the exposure device as viewed in the transporting direction of the photosensitive material is capable of absorbing a difference in speed between the transporting speed of the photosensitive material on the photosensitive-material supplying device side and the transporting speed of the photosensitive material on the exposure device side.

In accordance with a ninth aspect of the present invention, the apparatus according to the sixth or seventh aspect further comprises: an accommodating section capable of accommodating at least one photosensitive-material supplying means for supplying an elongated photosensitive material onto which a plurality of pieces of image information are exposed along a longitudinal direction thereof, the photosensitive-material supplying means being capable of being driven independently; and a single cutter disposed between the accommodating section and the transporting means so as to cut the elongated photosensitive material supplied from the photosensitive-material supplying means into each portion onto which one piece of image information is to be exposed, in a direction substantially perpendicular to a direction in which the photosensitive material is supplied, wherein in a case where two or more photosensitive-material supplying means are accommodated in the accommodating section, and two or more elongated photosensitive materials are supplied from the two or more photosensitive-material supplying means, the single cutter has a size capable of simultaneously cutting the two or more elongated photosensitive materials.

A description will be given of the operation of the apparatus for exposing a photosensitive material in accordance with the ninth aspect of the present invention.

In a case where two or more photosensitive-material supplying means which are respectively driven independently are provided, the lengths of the photosensitive materials supplied to the exposure device can be varied respectively. In a case where a long photosensitive material and a short photosensitive material are required, the operation of one photosensitive-material supplying means is operated a predetermined time earlier than that of the other photosensitive-material supplying means, and the transport of the photosensitive materials is stopped after predetermined amounts have been supplied, and the trailing ends of the photosensitive materials are cut by the cutter (incidentally, an arrangement may be provided such that the speed of transport by one photosensitive-material supplying means is increased over that by another photosensitive-material supplying means, and the transport of the photosensitive materials is stopped after predetermined amounts have been supplied, and the trailing ends of the photosensitive materials are cut by the cutter). Hence, photosensitive materials having varying lengths can be supplied to the transporting means. If photosensitive materials of the same length are supplied in parallel, it suffices if the photosensitive materials are cut after they are transported for the same time duration at the same speed.

In accordance with a 10th aspect of the present invention, in the apparatus for exposing a photosensitive material according to the sixth aspect of the present invention, lengths of the plurality of photosensitive materials in a direction in which the plurality of photosensitive materials are transported by the transporting means are substantially identical, the plurality of photosensitive materials are arranged in a direction substantially perpendicular to the transporting direction and are transported by the transporting means, and the exposure system collectively exposes the plurality of photosensitive materials arranged in the perpendicular direction.

A description will be given of the operation of the apparatus for exposing a photosensitive material in accordance with the 10th aspect of the present invention.

The plurality of photosensitive materials having substantially identical lengths along the transporting direction are arranged in parallel, and are collectively exposed. Consequently, in a case where the photosensitive materials are processed, it is possible to reduce overall intervals between the photosensitive materials in the transporting direction, thereby enhancing processing efficiency.

In accordance with an 11th aspect of the present invention, each of the plurality of photosensitive materials arranged in rows includes a plurality of photosensitive materials, and the plurality of photosensitive materials are supported and transported by the transporting means such that while one photosensitive material among the plurality of photosensitive materials in one row is being exposed, the supply to the exposure region and/or the discharge from the exposure region of a photosensitive material, located in a vicinity of the one photosensitive material, among the plurality of photosensitive materials in another row is effected.

A description will be given of the operation of the apparatus for exposing a photosensitive material in accordance with the 11th aspect of the present invention.

In this aspect, in a case where the exposure region of the exposure system (or scanning exposure system) is incapable of covering all the plurality of rows, while one photosensitive material in a predetermined row is being exposed, at least one photosensitive material in another row is supplied to or discharged from the exposure region. Incidentally, it is preferable to effect the supply and discharge concurrently, thereby making it possible to attain high efficiency.

In accordance with a 12th aspect of the present invention, there is provided an apparatus for exposing a photosensitive material, comprising: single transporting means for supporting a plurality of elongated photosensitive materials, onto which a plurality of pieces of image information are exposed along longitudinal directions thereof, in a state in which the plurality of elongated photosensitive materials are spaced apart from each other in a widthwise direction thereof, the single transporting means being adapted to transport the plurality of elongated photosensitive materials in parallel along the longitudinal directions thereof; and a single scanning exposure system for effecting scanning exposure of the plurality of elongated photosensitive materials, supported by the single transporting means, in an exposure region along the widthwise direction, the single scanning exposure system being capable of setting a width of each of the pieces of image information to be exposed to a dimension larger than a width of each of the photosensitive materials.

A description will be given of the operation of the apparatus for exposing a photosensitive material in accordance with the 12th aspect of the present invention.

A plurality of elongated photosensitive materials are arranged in parallel at intervals, and are transported at predetermined intervals in the direction of the rows by the single transporting means. The plurality of elongated photosensitive materials are exposed by a single scanning exposure system. Here, the width of each piece of the image information to be exposed is set to a dimension larger than at least the width of each photosensitive material in the exposure region. For this reason, even if the position of the photosensitive material is slightly offset in the widthwise direction (in a direction substantially perpendicular to the transporting direction of the photosensitive material), it is possible to prevent a situation in which an unexposed portion (a whitened portion) is produced in a widthwise edge of the photosensitive material, or part of adjacent image information is exposed therein.

In accordance with a 13th aspect of the present invention, there is provided a printer processor comprising: single transporting means capable of transporting a plurality of photosensitive materials at predetermined intervals in parallel; a single exposure system for exposing the plurality of photosensitive materials supported by the single transporting means, the single exposure system being capable of setting a size of each piece of image information to be exposed to a size larger than a size of each of the plurality of photosensitive materials; a processing section for processing the exposed plurality of photosensitive materials while transporting the exposed plurality of photosensitive materials; and a sorter for receiving the plurality of photosensitive materials discharged from the processing section, and for accumulating the photosensitive materials after transporting the plurality of photosensitive materials in a direction intersecting a transporting direction in the processing section, wherein the single exposure system exposes the plurality of photosensitive materials such that the photosensitive materials are arranged in an order of frames, starting from a downstream side of the sorter as viewed in a transporting direction of the photosensitive materials.

A description will be given of the operation of the apparatus for exposing a photosensitive material in accordance with the 13th aspect of the present invention.

The photosensitive materials arranged in parallel such that the photosensitive materials are exposed in the order of frames, starting from a downstream side of the sorter as viewed in a transporting direction of the photosensitive materials. The exposed photosensitive materials are transported to the sorter in the order of frame numbers, and are accumulated.

The above and other objects, features and advantages of the present invention will become more apparent from the following detailed description of the invention when read in conjunction with the accompanying drawings.

DESCRIPTION OF THE PREFERRED EMBODIMENTS

First Embodiment

Referring to FIGS. 1 to 20, a description will be given of a first embodiment.

Figure 1:
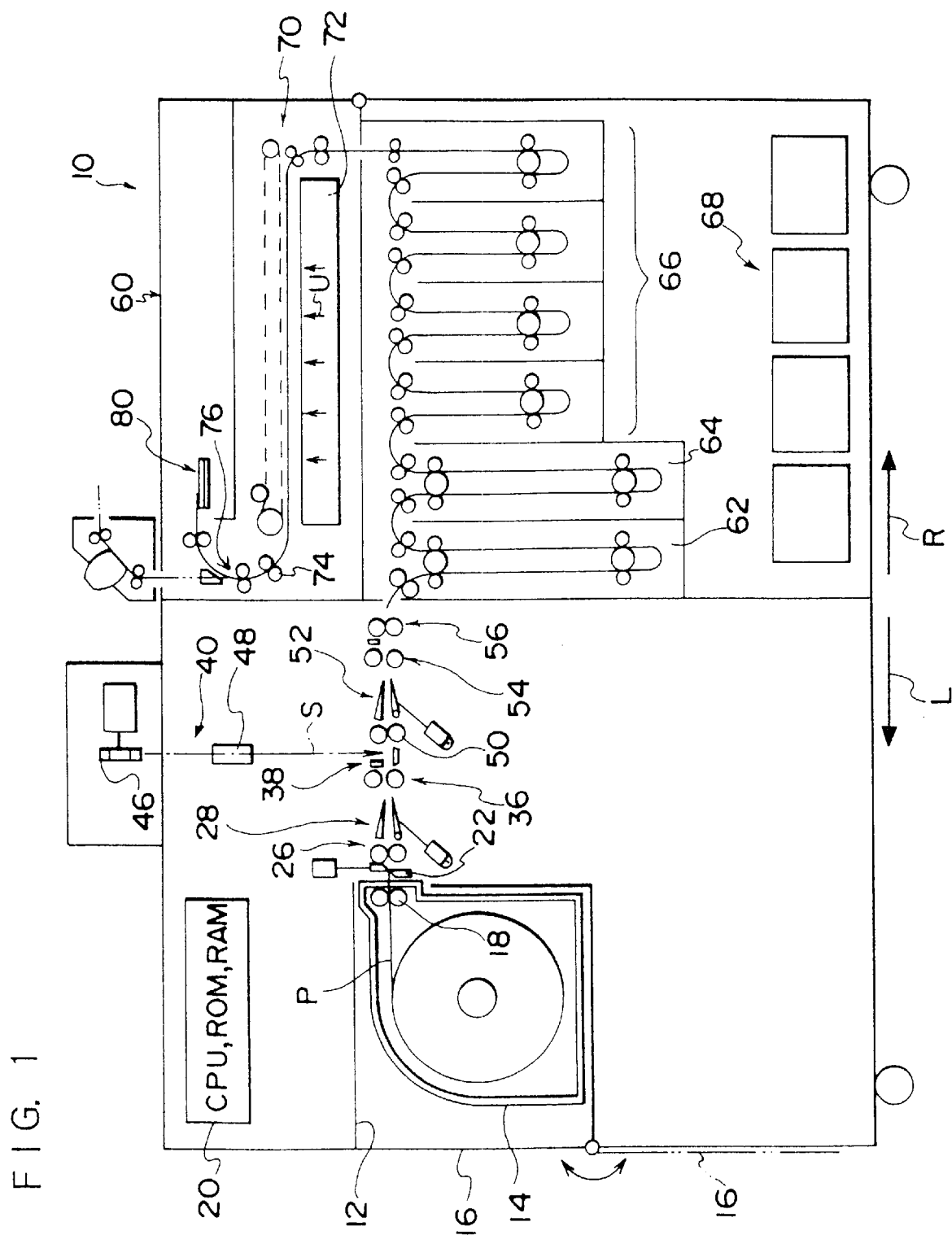
FIG. 1 is a schematic diagram of a printer processor.

As shown in FIG. 1, a magazine accommodating section 12 is provided inside a printer processor 10 on the side indicated by the direction of arrow L, and magazines 14 each accommodating a photographic printing paper P in roll form are loaded in the magazine accommodating section 12. Incidentally, the magazines 14 are changeable if a door 16 of the magazine accommodating section 12 is opened.

Figure 2:
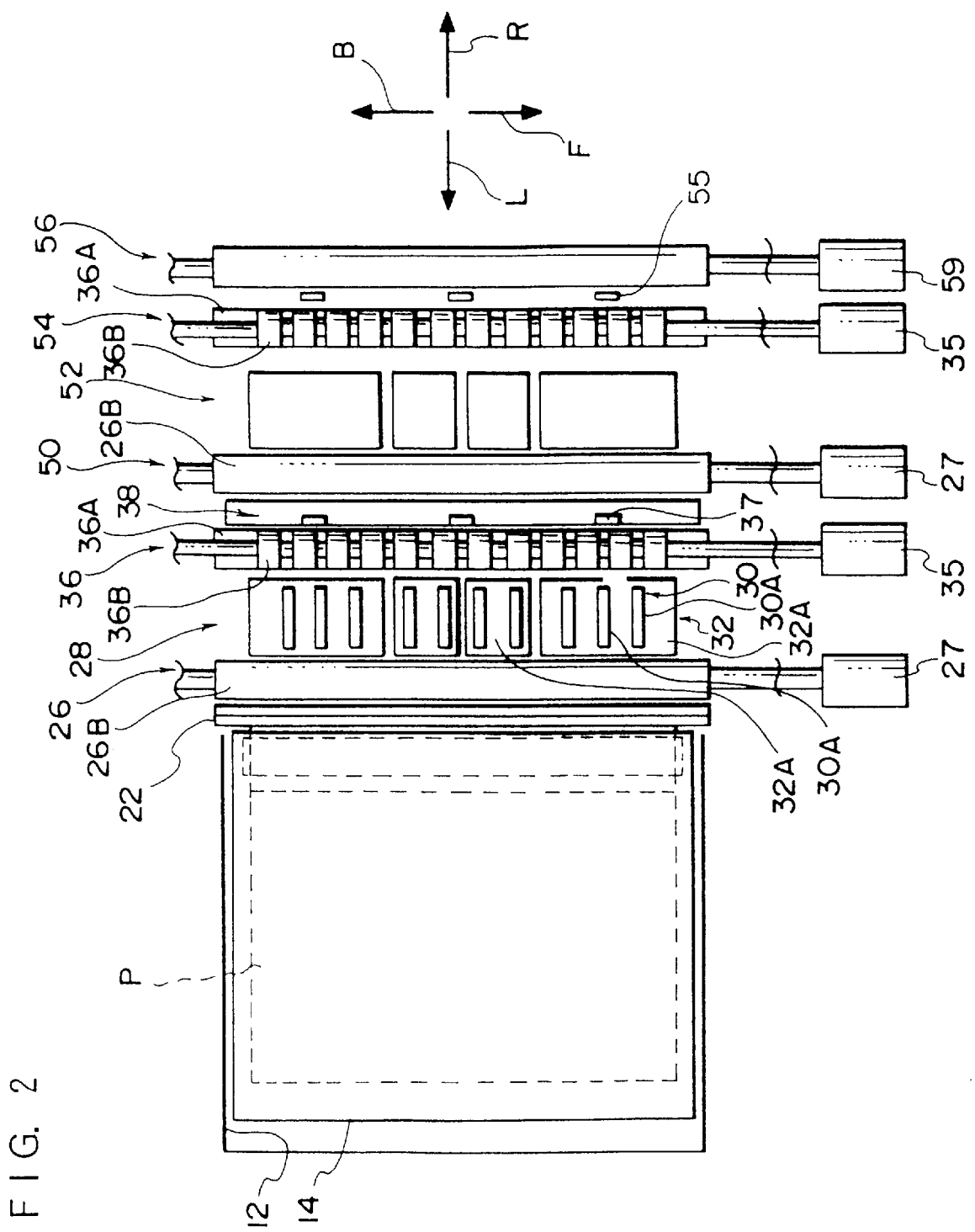
FIG. 2 is a plan view illustrating a transport passage of a printing paper from a magazine accommodating section, in which a wide magazine is loaded, to a position short of a processor section.

In this printer processor 10, the transport passage of the printing paper P is set widely so that printing papers P of various widths can be processed. For example, as shown in FIG. 2, one magazine 14 accommodating a wide printing paper P can be loaded in the magazine accommodating section 12; as shown in FIG. 3, three magazines 14 accommodating narrow printing papers P can be loaded therein in juxtaposition; or as shown in FIG. 4, two magazines 14 accommodating medium-width printing papers P can be loaded therein in juxtaposition.

Figure 5:
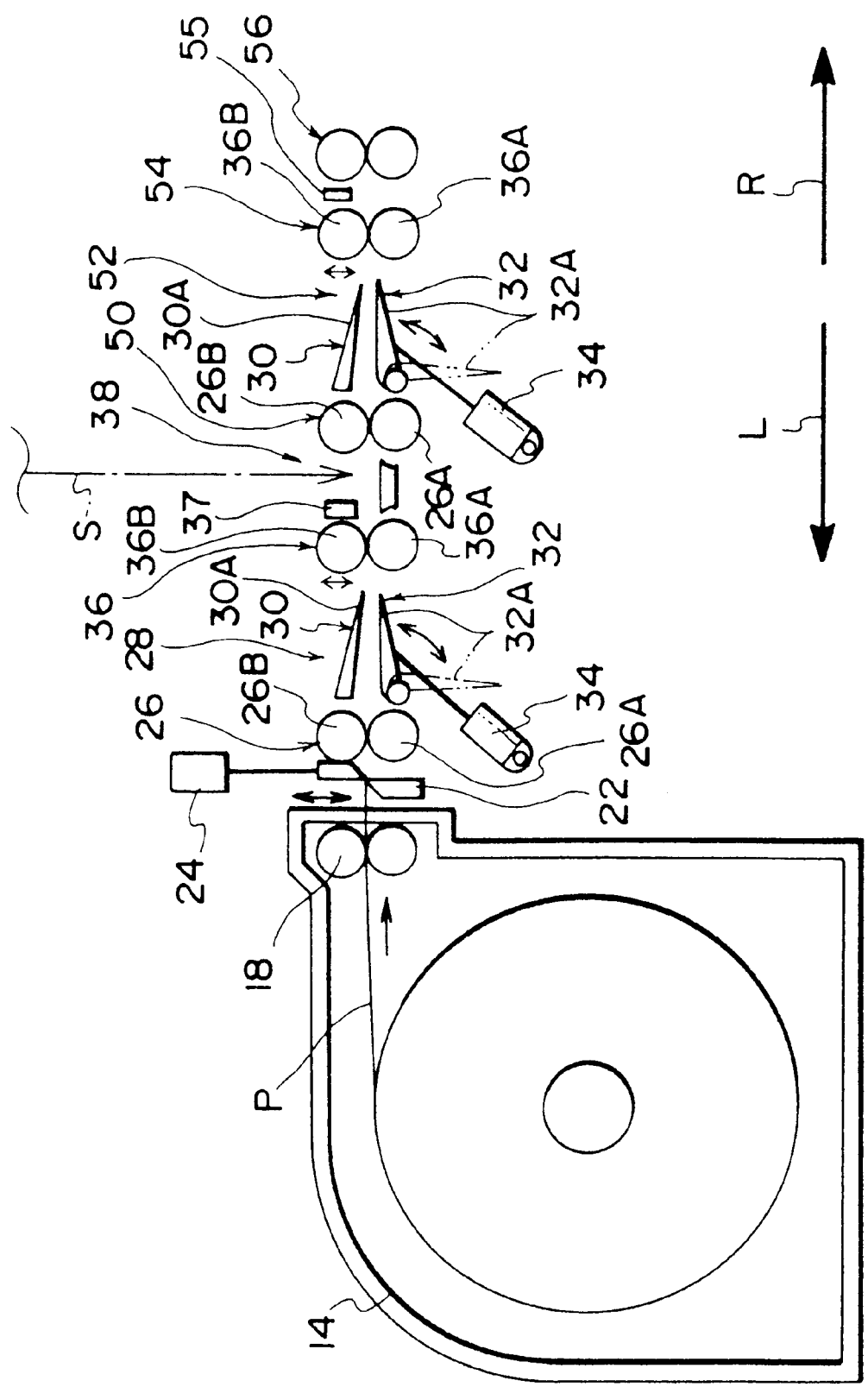
FIG. 5 is a cross-sectional view illustrating the transport passage of the printing paper from the magazine accommodating section to the position short of the processor section.

As shown in FIG. 5, a pair of feed rollers 18 for feeding the printing papers P to outside of the magazine 14 is provided in the vicinity of an outlet for the printing papers P inside the magazine. The feed rollers 18 are rotated by receiving a driving force from a driving source (not shown) outside the magazine 14, so as to feed the printing papers P in the direction of arrow R. This driving source is provided in correspondence with each magazine, and its operation is controlled by a controller 20 (see FIG. 1) provided in the printer processor.

Accordingly, in this printer processor, if a plurality of magazines 14 are loaded, a plurality of printing papers P can be transported in parallel in a single transporting device.

Figure 3:
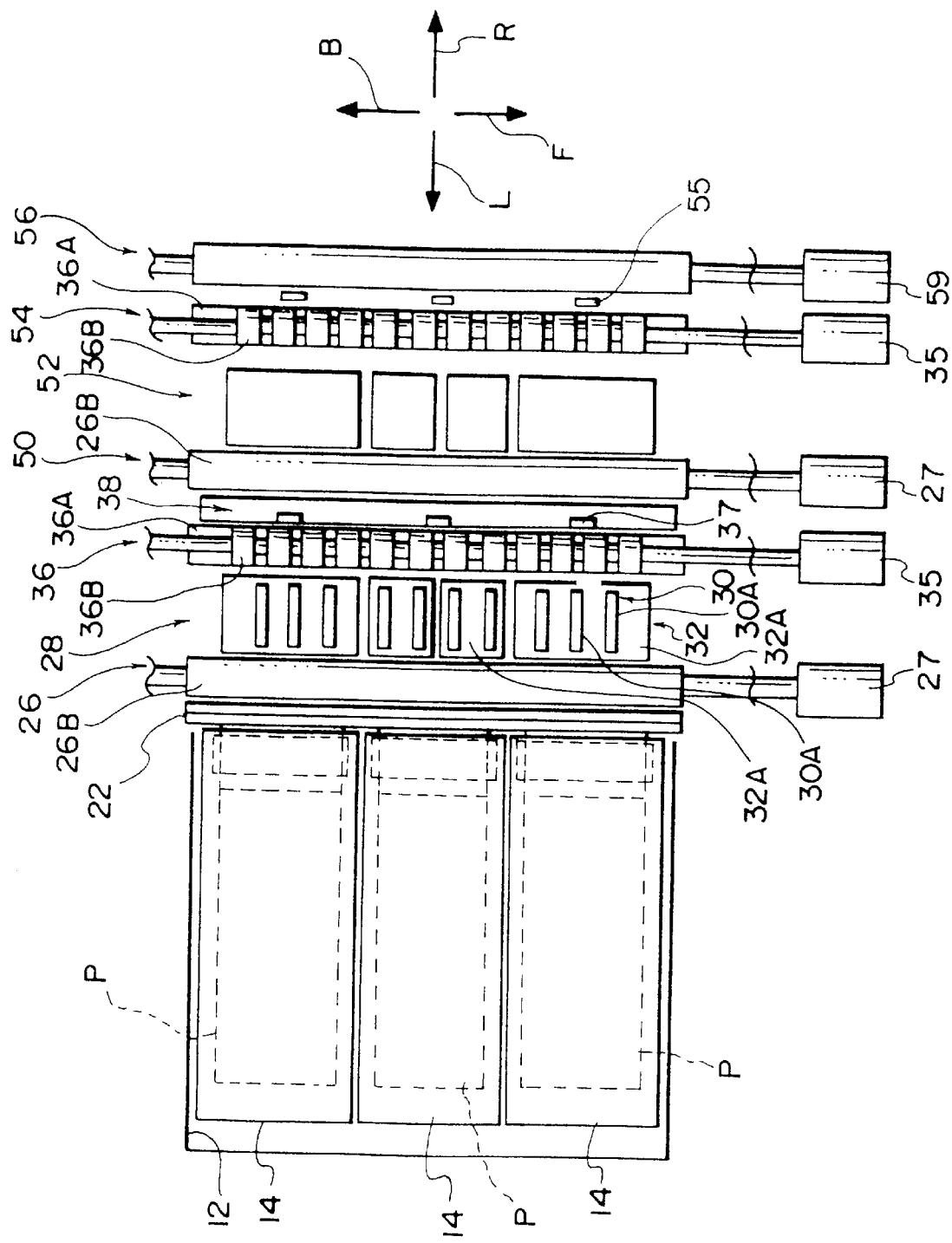
FIG. 3 is a plan view illustrating transport passages of printing papers from the magazine accommodating section, in which narrow magazines are loaded, to the position short of the processor section.
Figure 4:
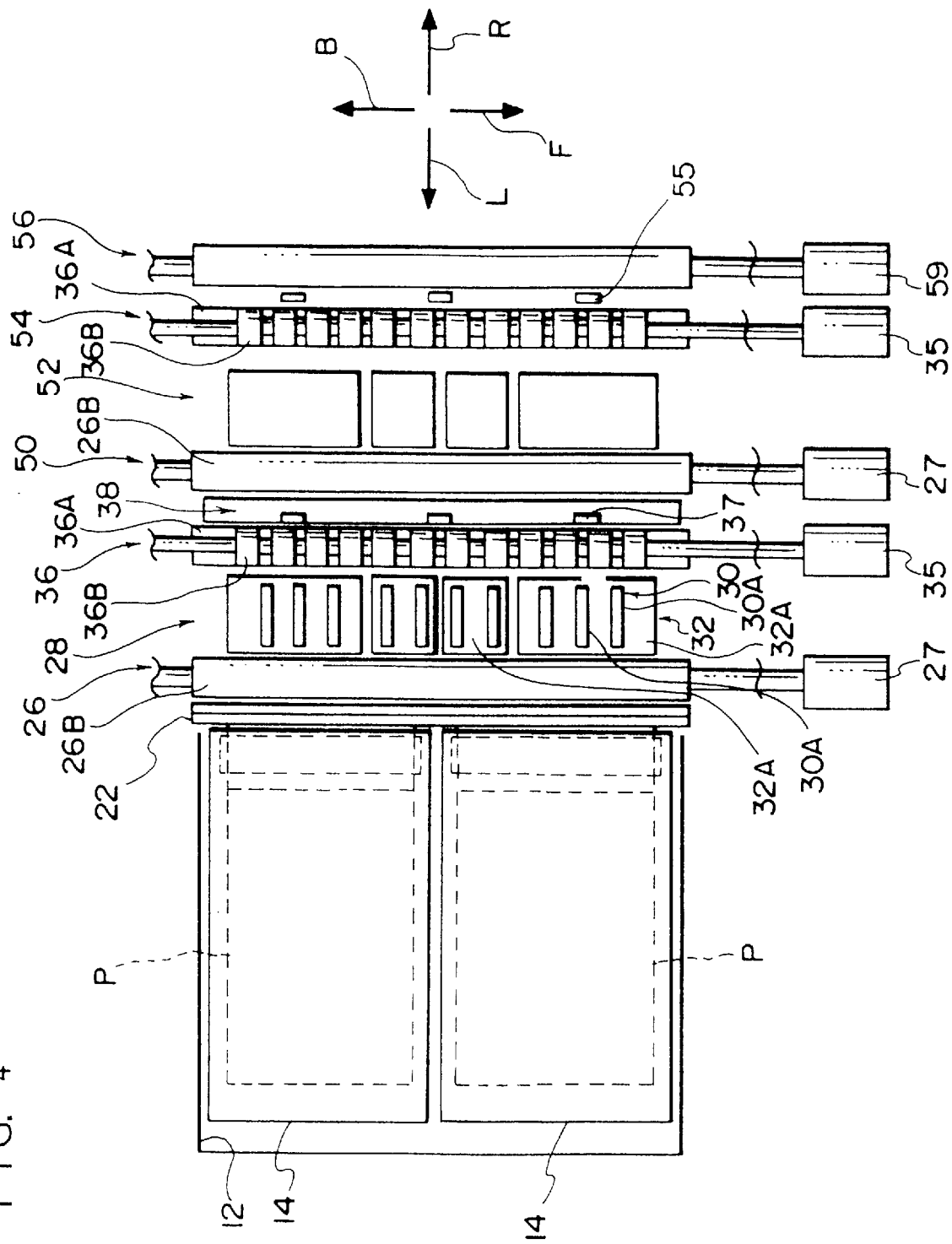
FIG. 4 is a plan view illustrating transport passages of printing papers from the magazine accommodating section, in which medium-width magazines are loaded, to the position short of the processor section.

As shown in FIGS. 3 and 5, a cutter 22 which is elongated in the widthwise direction of the printing paper P (in the direction of arrow F and arrow B) is disposed downstream of the magazine 14 as viewed in the transporting direction of the printing paper P. As shown in FIG. 5, the cutter 22 is driven by a cutter driving device 24, and is capable of cutting a plurality of rows of printing papers P substantially simultaneously. The operation of the cutter driving device 24 is also controlled by the aforementioned controller 20.

As shown in FIGS. 3 and 5, a first pair of transport rollers 26, which consists of a lower roller 26A and an upper roller 26B, is disposed downstream of the cutter 22 as viewed in the transporting direction of the printing paper p.

The lower roller 26A has a length longer than the width of the transport passage of the printing paper P, and is rotated by a motor 27 whose operation is controlled by the aforementioned controller 20. Incidentally, the upper roller 26B is a driven roller.

A first accumulator 28 is disposed downstream of the first pair of transport rollers 26 as viewed in the transporting direction of the printing paper P. The first accumulator 28 is provided with a group of upper levers 30, which are arranged on the upper side of the transport passage of the printing paper P, as well as a group of guides 32, which are arranged on the lower side of the transport passage of the printing paper P.

As shown in FIG. 3, the group of upper levers 30 are arranged such that a plurality of small levers 30A extending along the transporting direction of the printing paper P are arrayed along the widthwise direction of the printing paper P.

Meanwhile, the group of guides 32 are arranged such a plurality of guide members 32A are are arrayed along the widthwise direction of the printing paper P. In this embodiment, two narrow guide members 32A are provided in a widthwise central portion, and wide guide members 32A are respectively provided on both sides thereof.

As shown in FIG. 2, when the wide printing paper P is transported, four guide members 32A correspond to that printing paper P. As shown in FIG. 3, when the narrow printing papers P are transported in three rows, the central printing paper P corresponds to the two narrow guide members 32A located at the center, while the printing papers P on both sides correspond to the respectively corresponding wide guide members 32A. In addition, as shown in FIG. 4, when the medium-width printing papers P are transported in two rows, each printing paper P corresponds to both one narrow guide member 32A and one wide guide member 32A which are adjacent to each other.

As shown in FIG. 5, driving sources 34 are each connected to the respective guide members 32A, such that each guide member 32A is rotatively driven by using the first accumulator 28-side end portion as an axis, and rotates between a horizontal state shown by the solid lines in FIG. 5 and a vertical state shown by the phantom lines (two-dotted dash lies). The operation of the driving sources 34 is controlled by the aforementioned controller 20.

As shown in FIGS. 3 and 5, a second pair of transport rollers 36 is disposed downstream of the first accumulator 28 as viewed in the transporting direction of the printing paper P. The second pair of transport rollers 36 consists of a lower roller 36A and an upper roller 36B disposed along the axial direction of the lower roller 36A. The upper roller 36B has a plurality of roller portions along its axial direction. The lower roller 36A has a length longer than the width of the transport passage of the printing paper P, and is rotated by a motor 35 whose operation is controlled by the aforementioned controller 20.

Meanwhile, the upper roller 36B is adapted to move vertically by means of an unillustrated driving means whose operation is controlled by the aforementioned controller 20.

As shown in FIGS. 3 and 5, a plurality of sensors 37 for detecting the printing paper P are disposed along the widthwise direction of the printing paper P downstream of the second pair of transport rollers 36 as viewed in the transporting direction of the printing paper P. In this embodiment, three sensors 37 are provided so as to be able to detect the respective printing papers P individually when the printing paper P is transported in one row to three rows.

Figure 6:
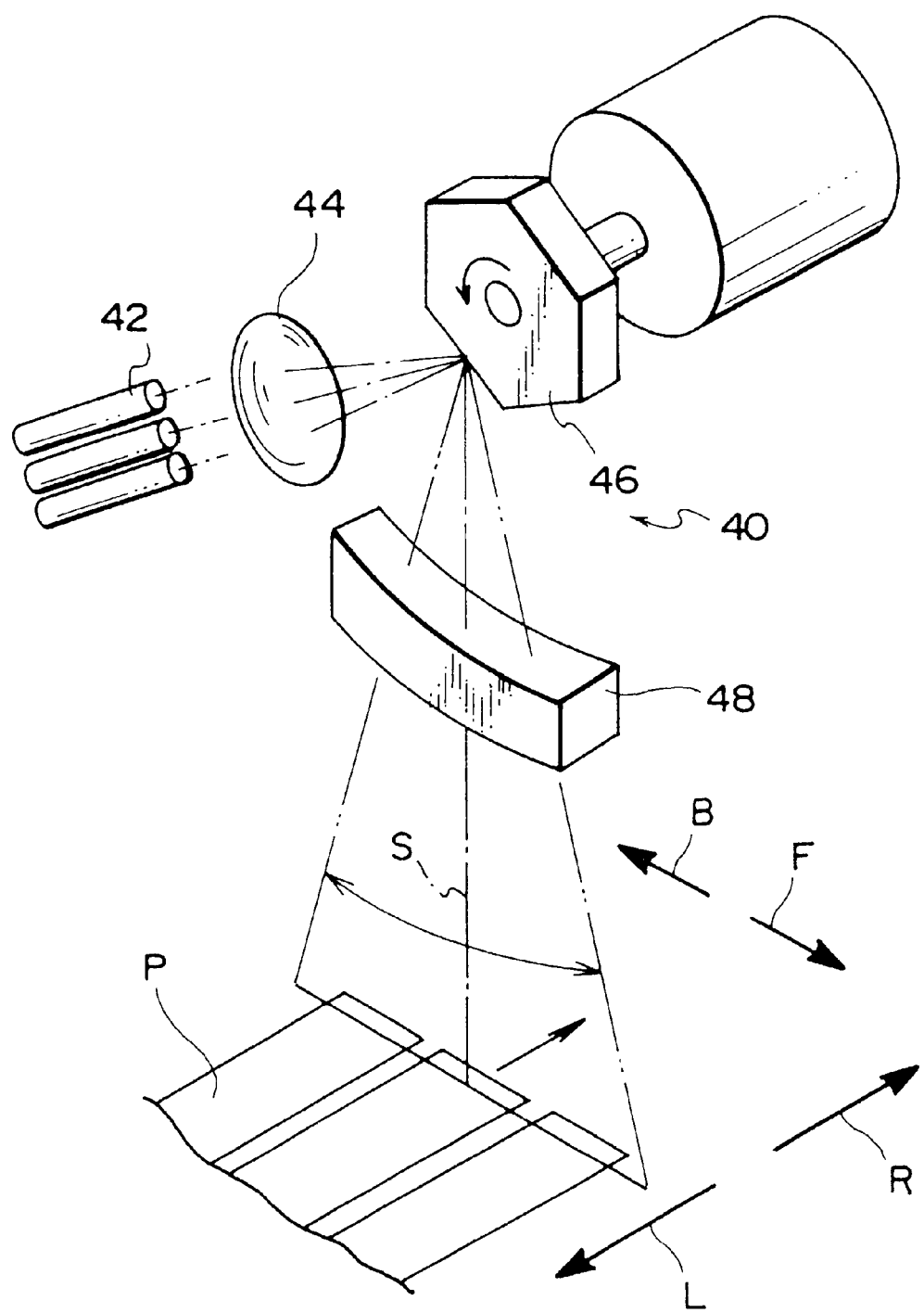
FIG. 6 is a perspective view of a scanning exposure system.

An exposure section 38 is disposed downstream of the sensors 37 as viewed in the transporting direction of the printing paper P. As shown in FIG. 1, the exposure section 38 has a scanning exposure system which is located above the transport passage of the printing paper P and whose operation is controlled by the aforementioned controller 20. As shown in FIG. 6, the scanning exposure system 40 has three laser transmitters 43 with mutually different wavelengths for forming a color image on the printing paper P, a focusing lens system 44, a polygon mirror 46, and a scanning lens system 48.

As shown in FIGS. 3 and 5, a third pair of transport rollers 50 is disposed downstream of the exposure section 38 as viewed in the transporting direction of the printing paper P. The third pair of transport rollers 50 is arranged in the same way as the first pair of transport rollers 26, and its operation is controlled by the aforementioned controller 20.

A second accumulator 52 is disposed downstream of the third pair of transport rollers 50 as viewed in the transporting direction of the printing paper P. This second accumulator 52 is is arranged in the same way as the first accumulator 28, identical components parts will be denoted by the same reference numerals, and a description thereof will be omitted.

A fourth pair of transport rollers 54 is disposed downstream of the second accumulator 52 as viewed in the transporting direction of the printing paper P. The fourth pair of transport rollers 54 is arranged in the same way as the second pair of transport rollers 36, and its operation is controlled by the aforementioned controller 20.

A plurality of sensors 55 for detecting the printing paper P are disposed along the widthwise direction of the printing paper P downstream of the fourth pair of transport rollers 54 as viewed in the transporting direction of the printing paper P. In this embodiment, three sensors 55 are provided so as to be able to detect the respective printing papers P individually when the printing paper P is transported in one row to three rows.

A pair of entrance rollers 56, which is rotated by a motor 59, and a processor section 60 are disposed downstream of the sensors 55 as viewed in the transporting direction of the printing paper P.

As shown in FIG. 1, a developing solution is stored in a developing tank 62 of the processor section 60, and the printing paper P is immersed in this developing solution to effect development processing. The printing paper P subjected to development processing is transported to a bleaching/fixing tank 64 located adjacent to the developing tank 62. A bleaching/fixing solution is stored in the bleaching/fixing tank 64, and the printing paper P is immersed in this bleaching/fixing solution to effect bleach processing and fixation processing. The printing paper P subjected to fixation processing is transported to a washing section 66 which is located adjacent to the bleaching/fixing tank 64 and includes a plurality of washing tanks in which washing water is stored, respectively. The printing paper P is immersed in t he washing water in the washing tanks to effect wash processing. Incidentally, a replenishing solution for development, a replenishing solution for bleaching and fixation, and replenishing water for washing are respectively sent to the developing tank 62, the bleaching/fixing tank 64, and the washing tanks of the washing section 66 from a plurality of replenishing tanks 68 disposed in the processor section 60, so as to be replenished for the solutions and water in the respective tanks.

The printing paper P subjected to wash processing is transported to a drying section 70 located above the washing section 66. In the drying section 70, the printer paper P is exposed to warm air which is blown from the side of a chamber 72 arranged on the lower side of the transport passage of the printing paper P in the direction of arrow U, so as to dry the printing paper P.

A transport passage 76, which is formed by a plurality of pairs of rollers 74, is disposed downstream of the drying section 70 as viewed in the transporting direction of the printing paper P. The printing paper P discharged from the drying section 70 upon completion of dry processing is nipped by the plurality of pairs of rollers 74, and is discharged to outside the printer processor 10.

Figure 7:
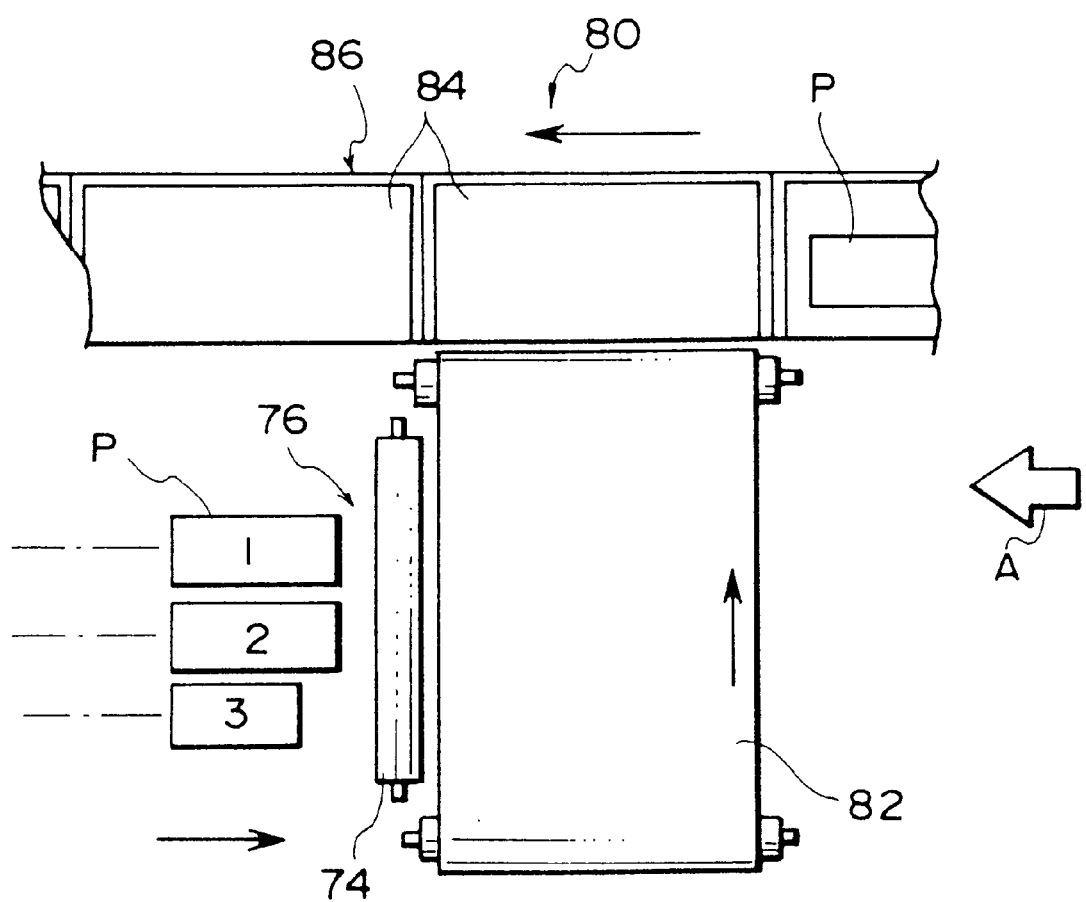
FIG. 7 is a plan view of a sorter.

As shown in FIG. 7, a sorter 80 is disposed on the discharge side of the transport passage 76 where the printer P is discharged.

Figure 8:
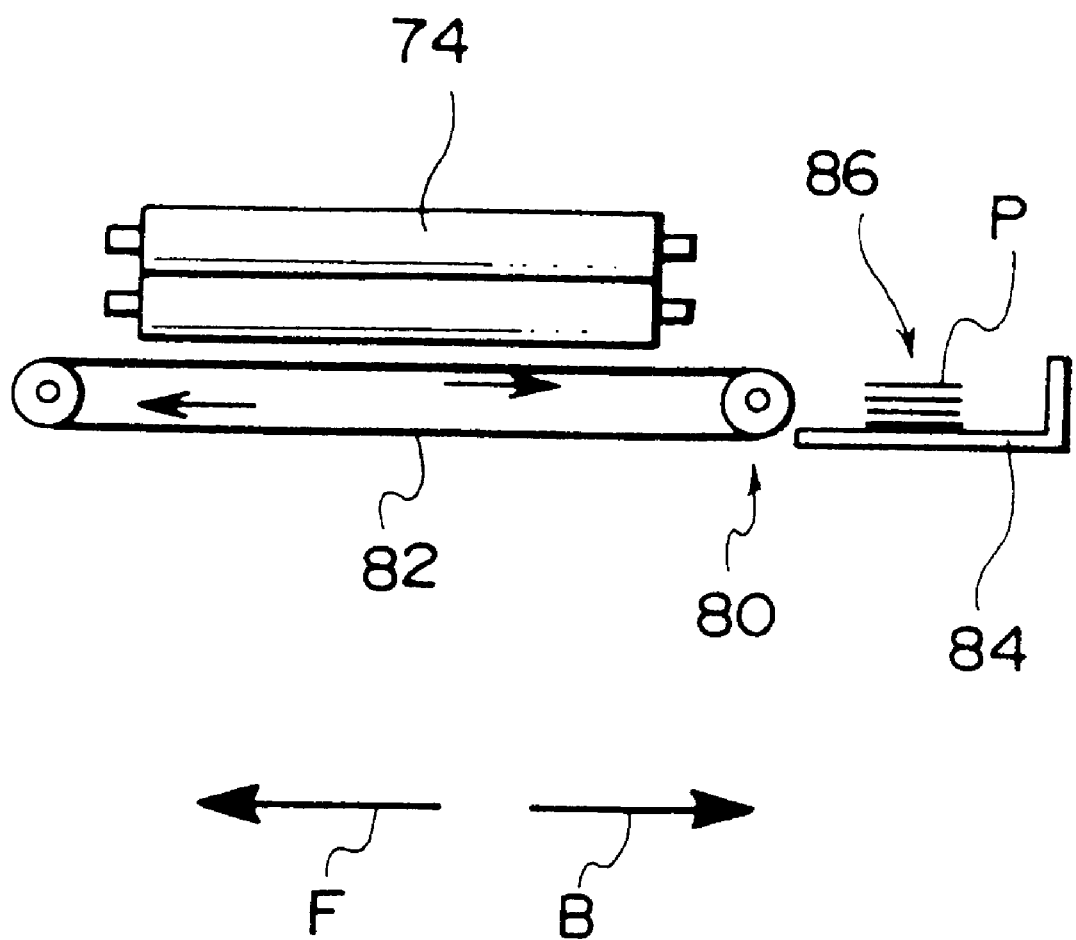
FIG. 8 is a view, taken in the direction of arrow A, of the sorter shown in FIG. 7.
Figure 9:
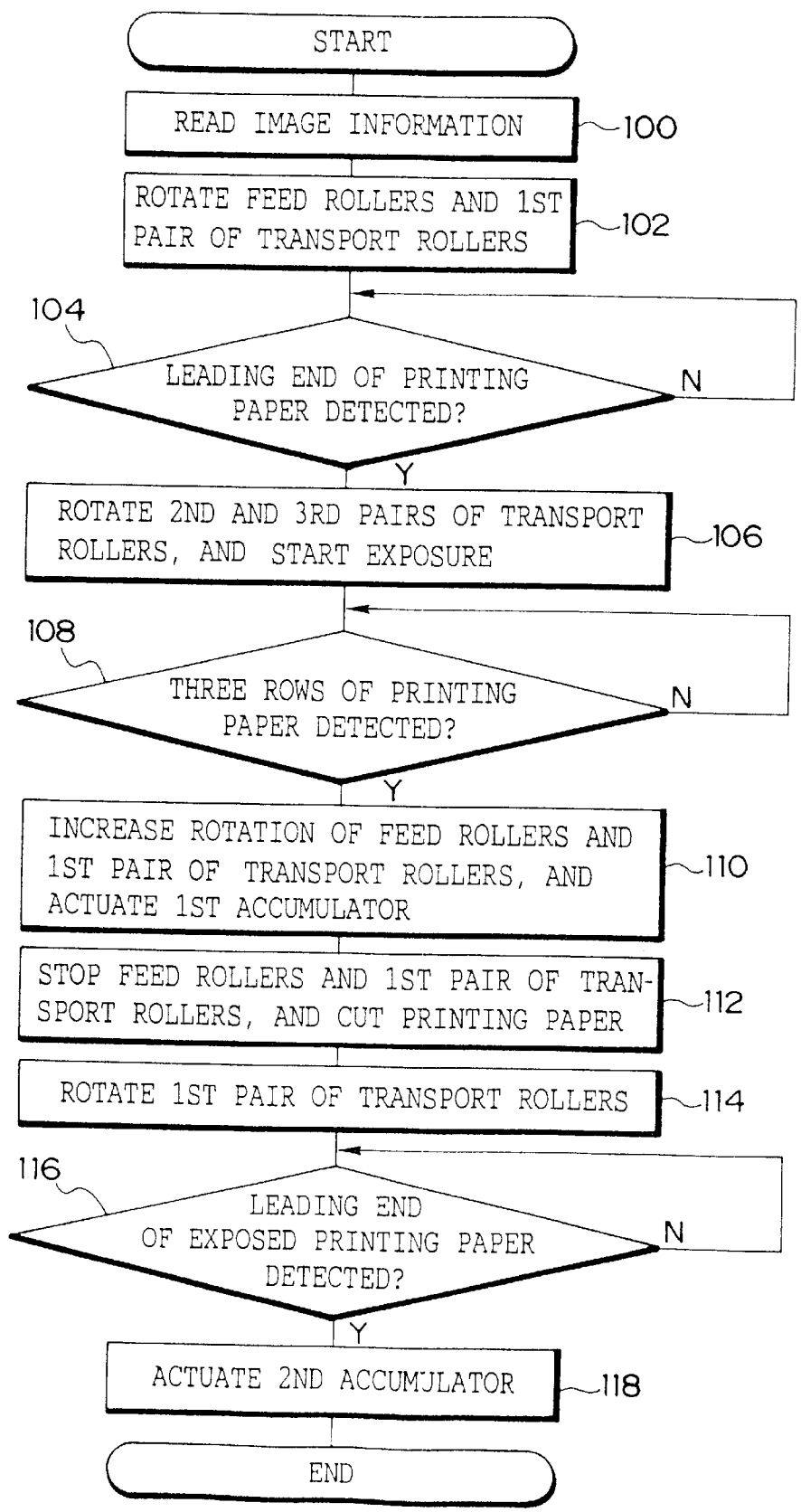
FIG. 9 is a flowchart on control.

As shown in FIGS. 7 and 8, the sorter 80 has a belt conveyor 82 on the lower side of the discharge side of the transport passage 76 where the printing paper P is discharged, so as to transport the printing paper P in the direction of arrow B perpendicular to the transporting direction of the transport passage 76. On the lower side of a downstream side of the belt conveyor 82 in the transporting direction, the sorter 80 has an accumulating portion 86 having a plurality of receiving trays 84 for accumulating the printing papers P thereon. Incidentally, the receiving trays are movable in the direction of arrow L perpendicular to the transporting direction of the belt conveyor 82 by an unillustrated driving device.

Next, a description will be given of the operation in accordance with this embodiment.

Here, a description will be given of an example in which three magazines 14 are loaded as shown in FIG. 3, and supply, cutting, scanning exposure, and development processing are carried out by using three rows of printing papers P.

Hereafter, a description will be given of an example of control with reference to the flowchart shown in FIG. 9 and FIGS. 10 to 20.

Figure 10:
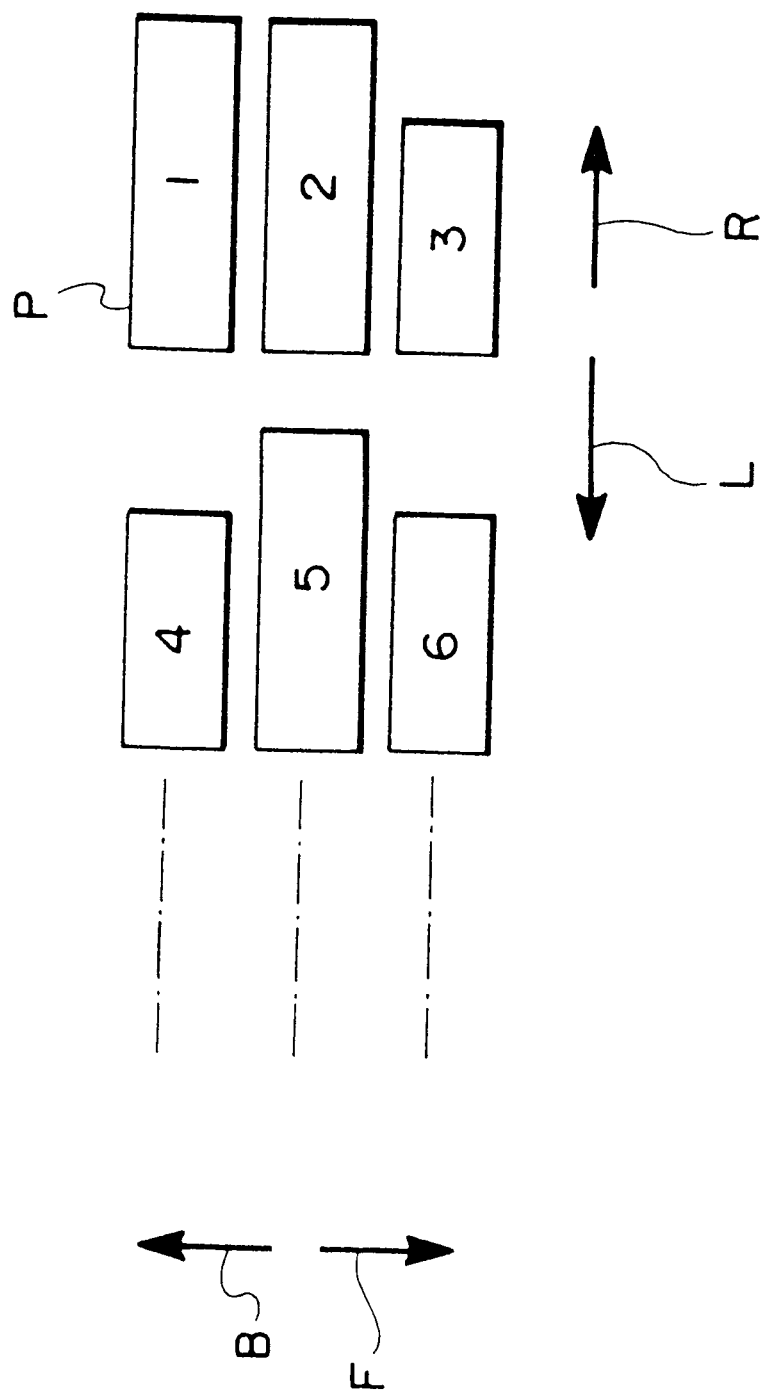
FIG. 10 is a plan view of printing papers which are transported in three rows.

First of all, the sizes (e.g., aspect ratios) of image information of a one-order portion (e.g., one negative film) to be exposed are read by the controller 20 (Step 100). As for the sizes of the image information, information from a sensor (scanner) for reading images on the negative film may be used, or the sizes of the image information may be entered by the operator through a keyboard. In this example, as shown in FIG. 10, control is provided such that frames are arranged in order starting from the downstream side of the belt conveyor 82 as viewed in the conveying direction, and the printing papers P are fed into the processor section 60 in a state in which trailing ends of the printing papers P arranged in the widthwise direction are aligned (incidentally, numerical figures allotted to the printing papers P denote frame numbers.)

Figure 11:
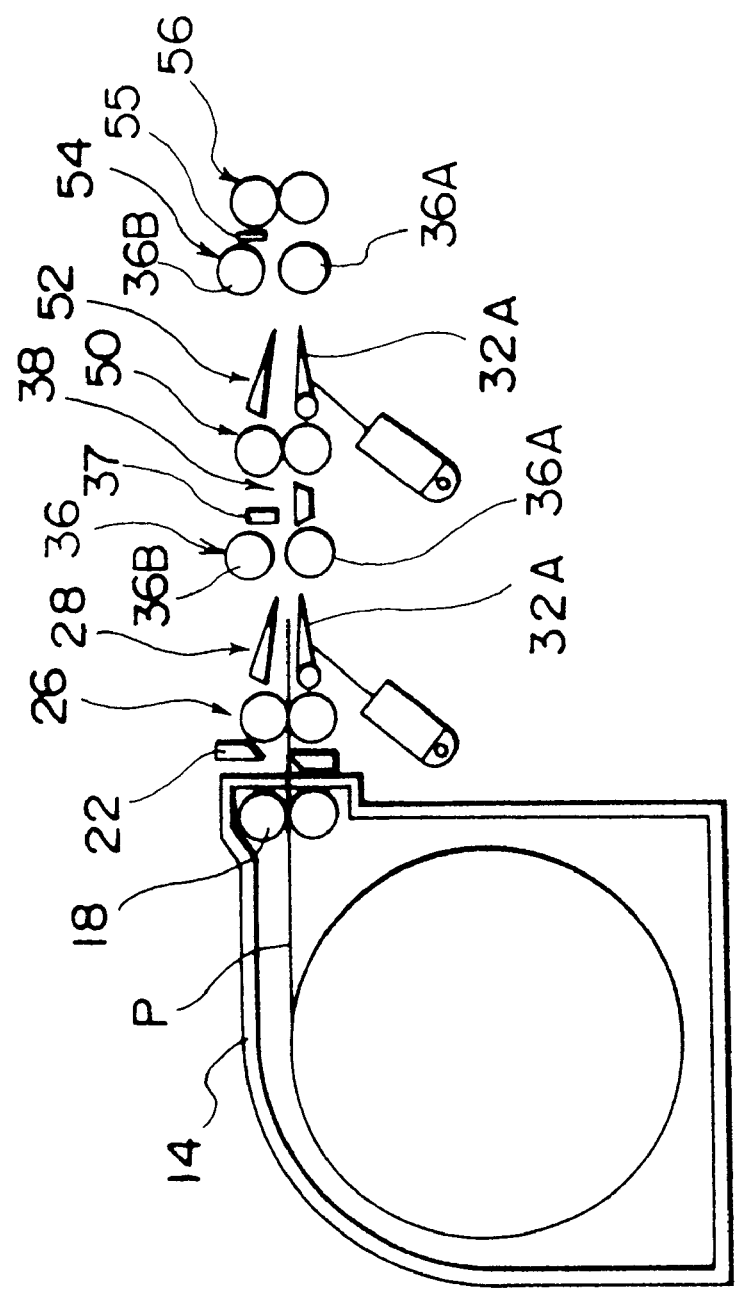
FIG. 11 is a plan view illustrating the transport passage of the printing paper from the magazine accommodating section to the position short of the processor section, and explains a state in which the printing paper has been fed out from the magazine.

As shown in FIG. 11, the feed rollers 18 of each magazine 14 are rotated in correspondence with the size of prints to be exposed. The printing papers P of lengths corresponding to print sizes are fed out from the respective magazines 14 in a parallel state, and are transported by the first pair of transport rollers 26 (Step 102). At this time, the transport rollers 18 of each magazine 14 start feeding the printing papers P in such a manner that the endings of feeding out of the respective printing papers P will occur substantially concurrently.

Figure 12:
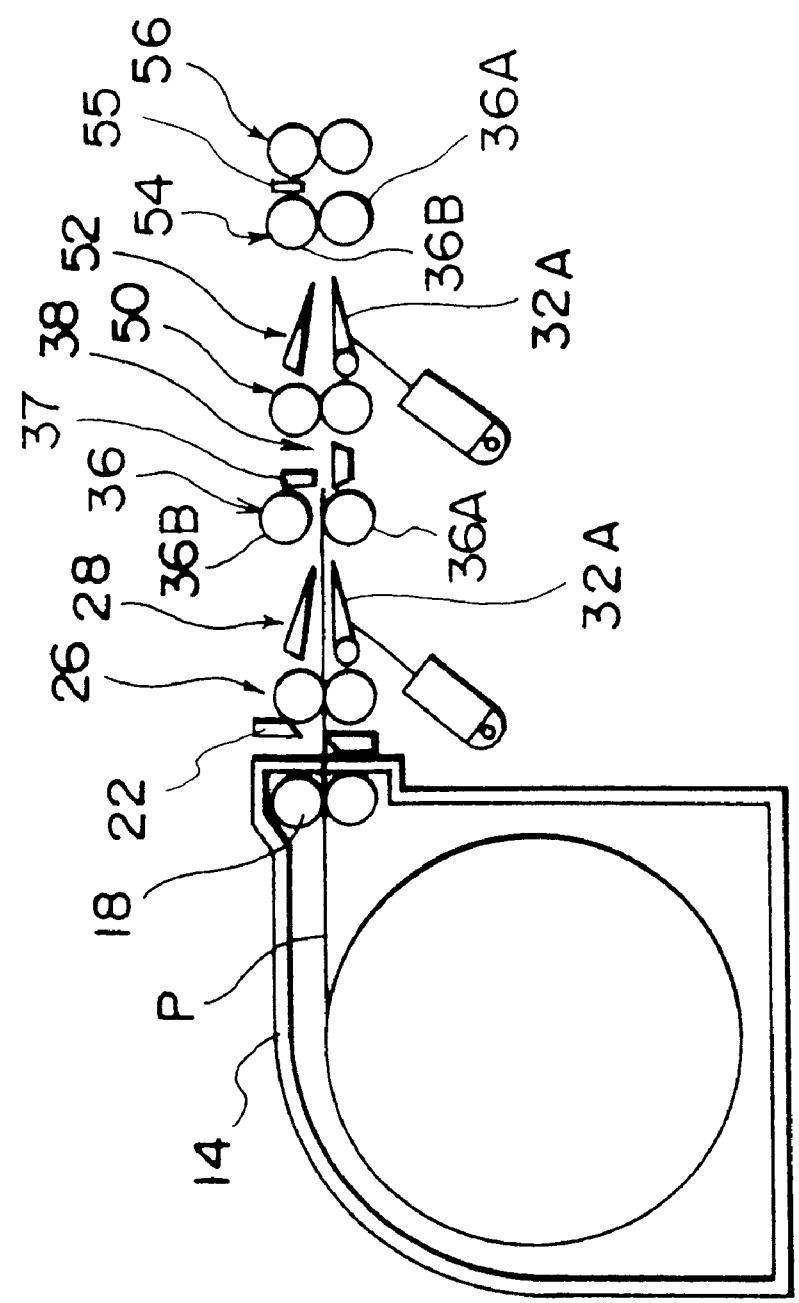
FIG. 12 is a plan view illustrating the transport passage of the printing paper from the magazine accommodating section to the position short of the processor section, and explains a state in which the printing paper has been detected by a sensor.
Figure 13:
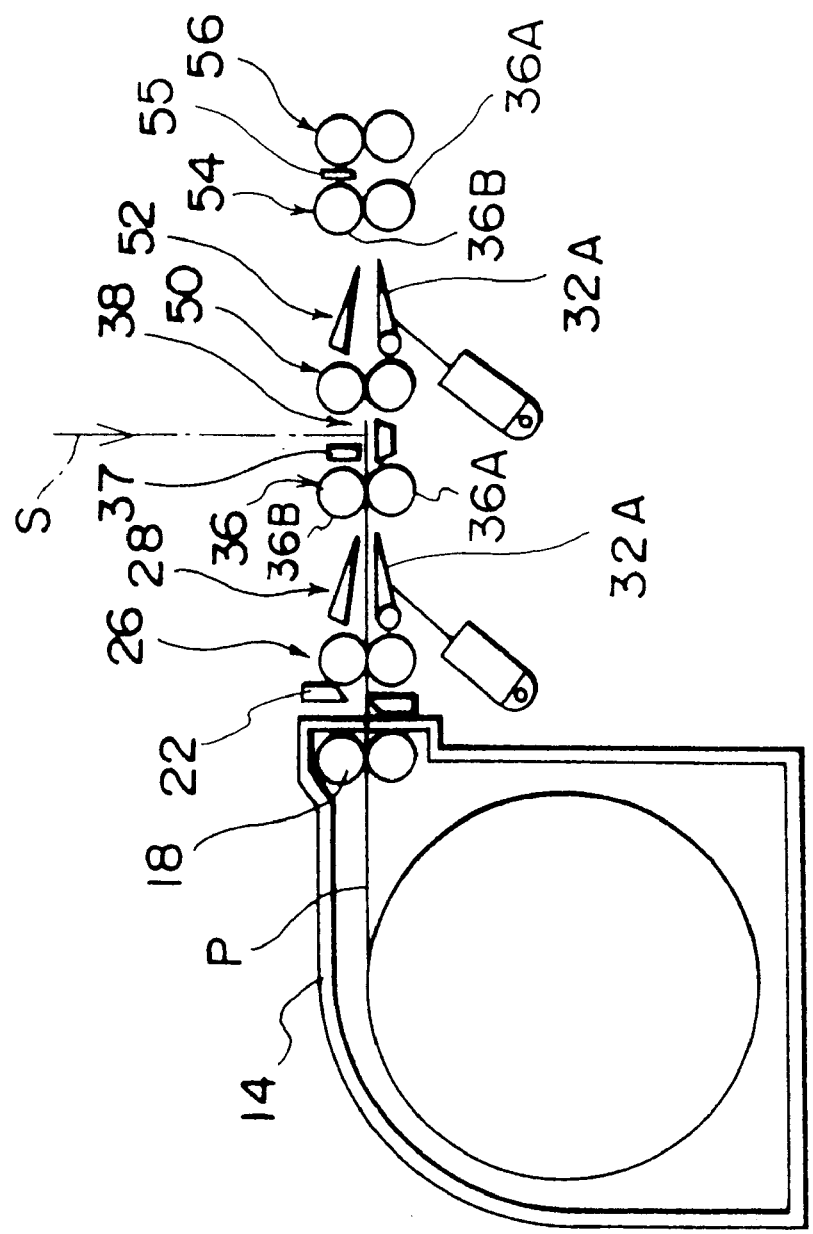
FIG. 13 is a plan view illustrating the transport passage of the printing paper from the magazine accommodating section to the position short of the processor section, and explains a state in which the printing paper has been fed out from the magazine.

As shown in FIG. 12, when the leading end of the printing paper P in the transporting direction thereof is detected by the sensor 37 (Step 104), the upper roller 36B, which was spaced apart from the lower roller 36A, is lowered as shown in FIG. 13, a portion in the vicinity of the leading end of the printing paper P in the transporting direction thereof is nipped by the lower roller 36A and the upper roller 36B, and the second pair of transport rollers 36 and the third pair of transport rollers 50 are driven at a predetermined speed (at a speed lower than the speed of the first pair of transport rollers 26). The printing papers P which have reached the exposure section 38 are scanned in the widthwise direction and are consecutively exposed by a laser beam S emitted from the scanning exposure system 40, starting from the leading-end side in the transporting direction (Step 106).

Figure 14:
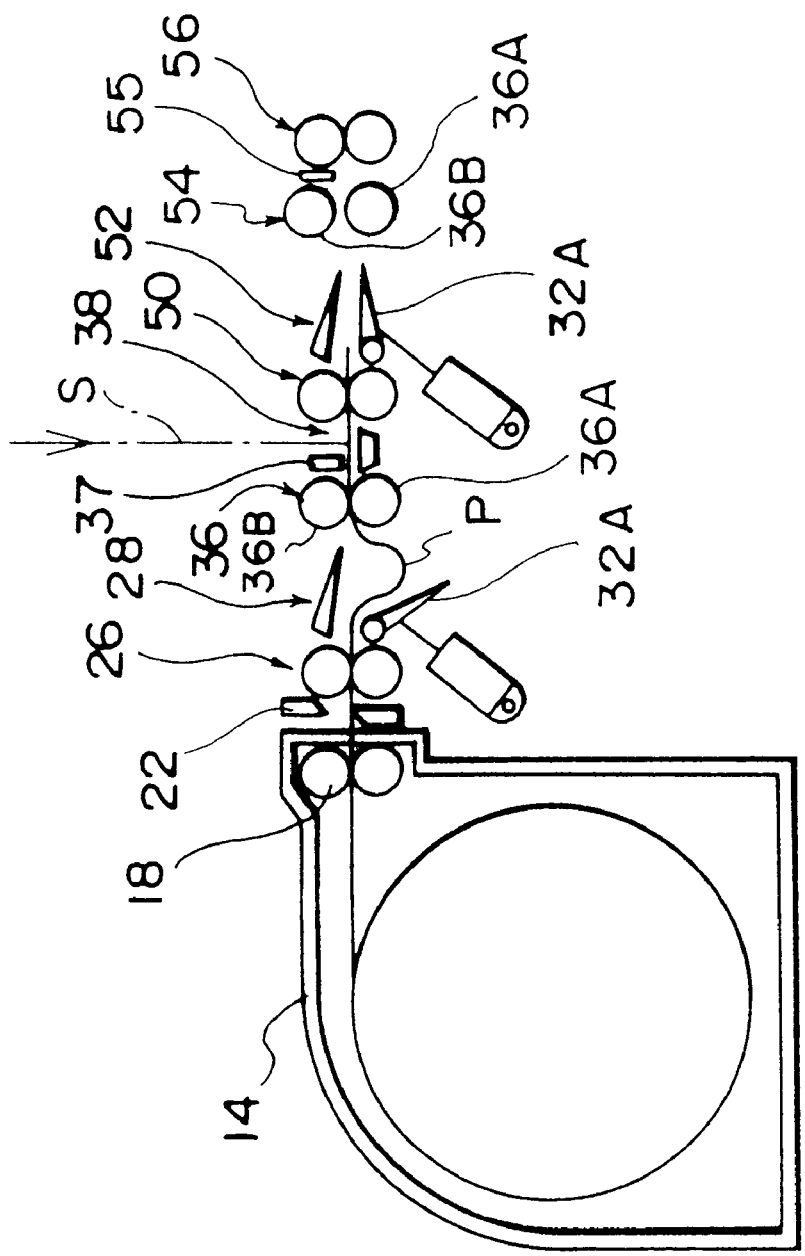
FIG. 14 is a plan view illustrating the transport passage of the printing paper from the magazine accommodating section to the position short of the processor section, and explains a state in which a first accumulator has been operated.

When all the three rows of printing papers P are nipped by the second pair of transport rollers 36 and are detected by the sensors 37 (Step 108), the feed rollers 18 of the magazine 14 and the first pair of transport rollers 26 rotate at a faster speed (> speed of the second pair of transport rollers 36) to feed a predetermined amount. At the same time, as shown in FIG. 14, the guide members 32A of the first accumulator 28 are set in a vertical state (Step 110), and intermediate portions of the three rows of printing papers P nipped by the second pair of transport rollers 36 are curved downward and are accumulated.

Figure 15:
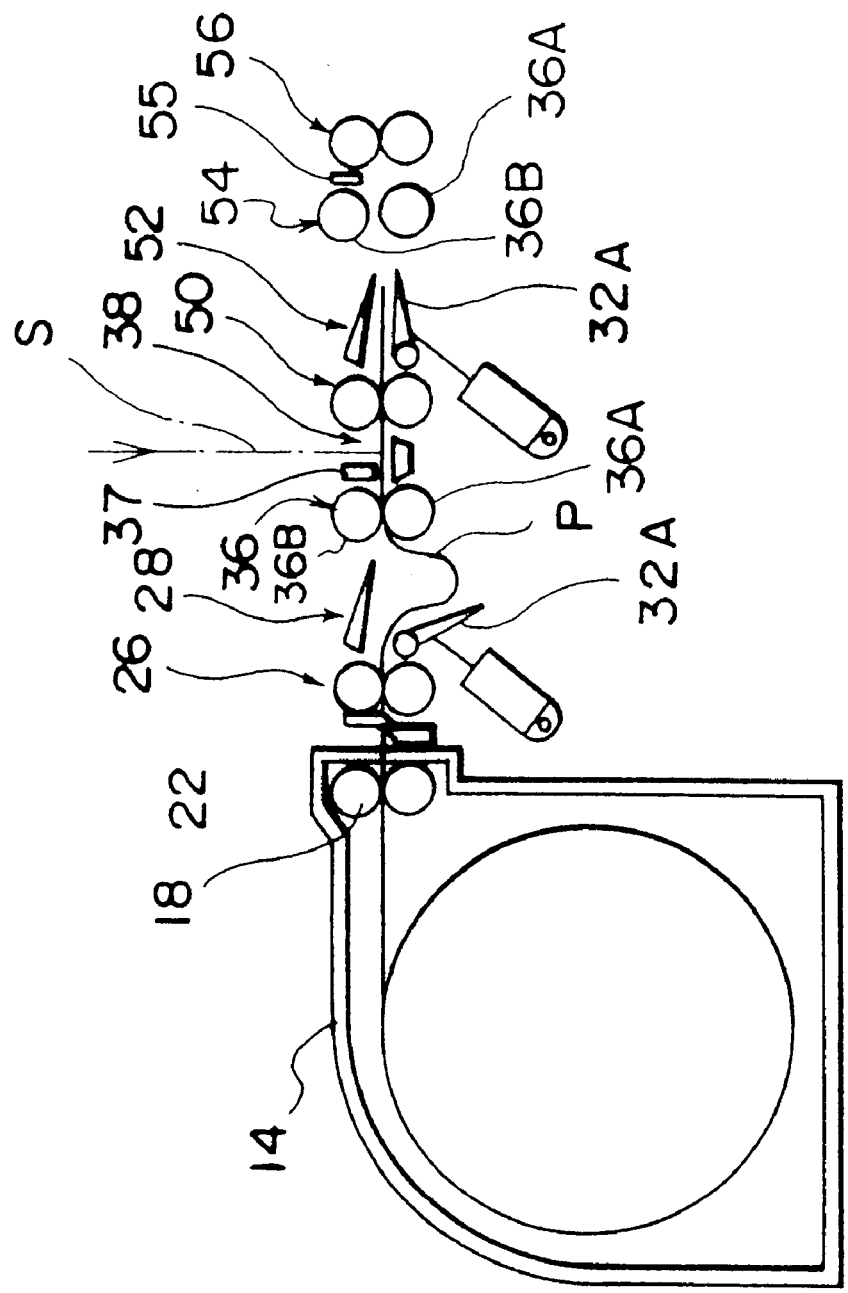
FIG. 15 is a plan view illustrating the transport passage of the printing paper from the magazine accommodating section to the position short of the processor section, and explains a state in which the trailing end of the printing paper has been cut by a cutter.

When predetermined amounts of the printing papers P are fed out from the magazines 14, the feed rollers 18 and the first pair of transport rollers 26 are temporarily stopped, and the cutter driving device 24 is actuated to cut the trailing ends of the three rows of printing papers P by the cutter 22 substantially at the same time (Step 112, see FIG. 15).

After the printing papers P are cut, the first pair of transport rollers 26 rotate again to feed the three rows of printing papers P (Step 114).

Figure 16:
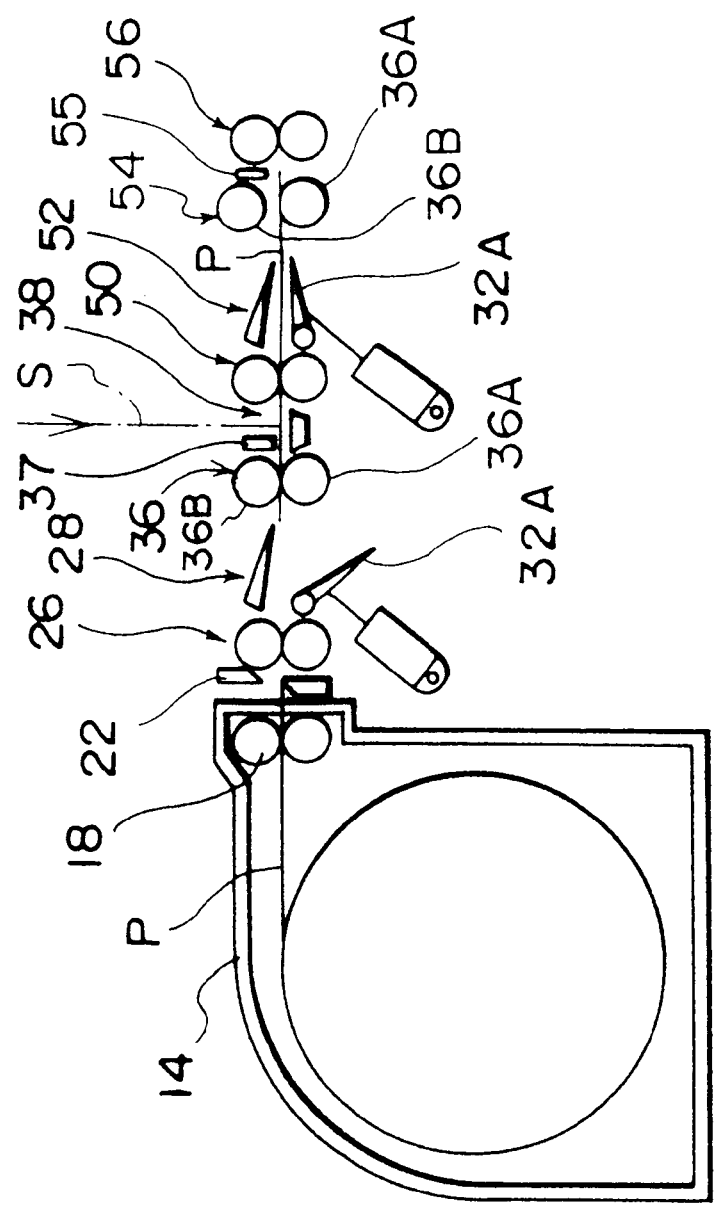
FIG. 16 is a plan view illustrating the transport passage of the printing paper from the magazine accommodating section to the position short of the processor section, and explains a state in which the exposed printing paper has been detected by a sensor.
Figure 17:
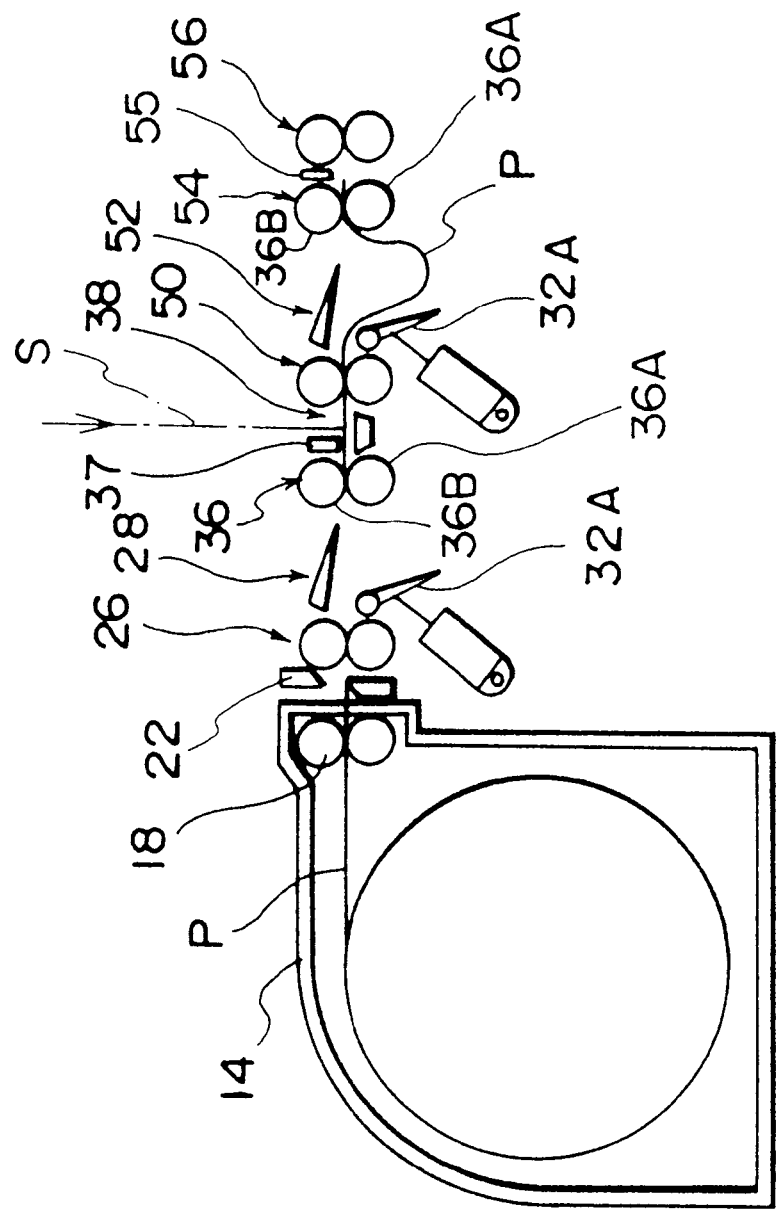
FIG. 17 is a plan view illustrating the transport passage of the printing paper from the magazine accommodating section to the position short of the processor section, and explains a state in which a second accumulator has been operated.

As shown in FIG. 16, when the leading end of the exposed printing paper P is detected by the sensor 55 disposed immediately after the fourth pair of transport rollers 54 via the second accumulator 52 (Step 116), the upper roller 36B, which was spaced apart from the lower roller 36A when the printing paper P was at the fourth pair of transport rollers 54, is lowered, so that a portion in the vicinity of the leading end of the printing paper P in the transporting direction thereof is nipped by the lower roller 36A and the upper roller 36B. The printing paper P whose leading end was detected is fed to the processor section 60 by the second pair of transport rollers 36 at a low speed matching the transporting speed in the processor section 60. Concurrently, the guide members 32A of the second accumulator 52 corresponding to the printing paper P detected by the sensor 55 are set in the vertical state (Step 118). Here, since the transporting speed of the fourth pair of transport rollers 54 is slower than that of the third pair of transport rollers 50, the printing papers P are curved downward and are accumulated downstream of the fourth pair of transport rollers 54, as shown in FIG. 17.

When the exposure of the three rows of printing papers P is completed (or when the rear ends of the printing papers P are discharged from the third pair of transport rollers 50), the feed rollers 18 of the respective magazines 14 are rotated in correspondence with the size of prints to be exposed next. Subsequently, the three rows of printing papers P are subjected to supply, cutting, and scanning exposure, and are transported to the processor section.

Figure 20:
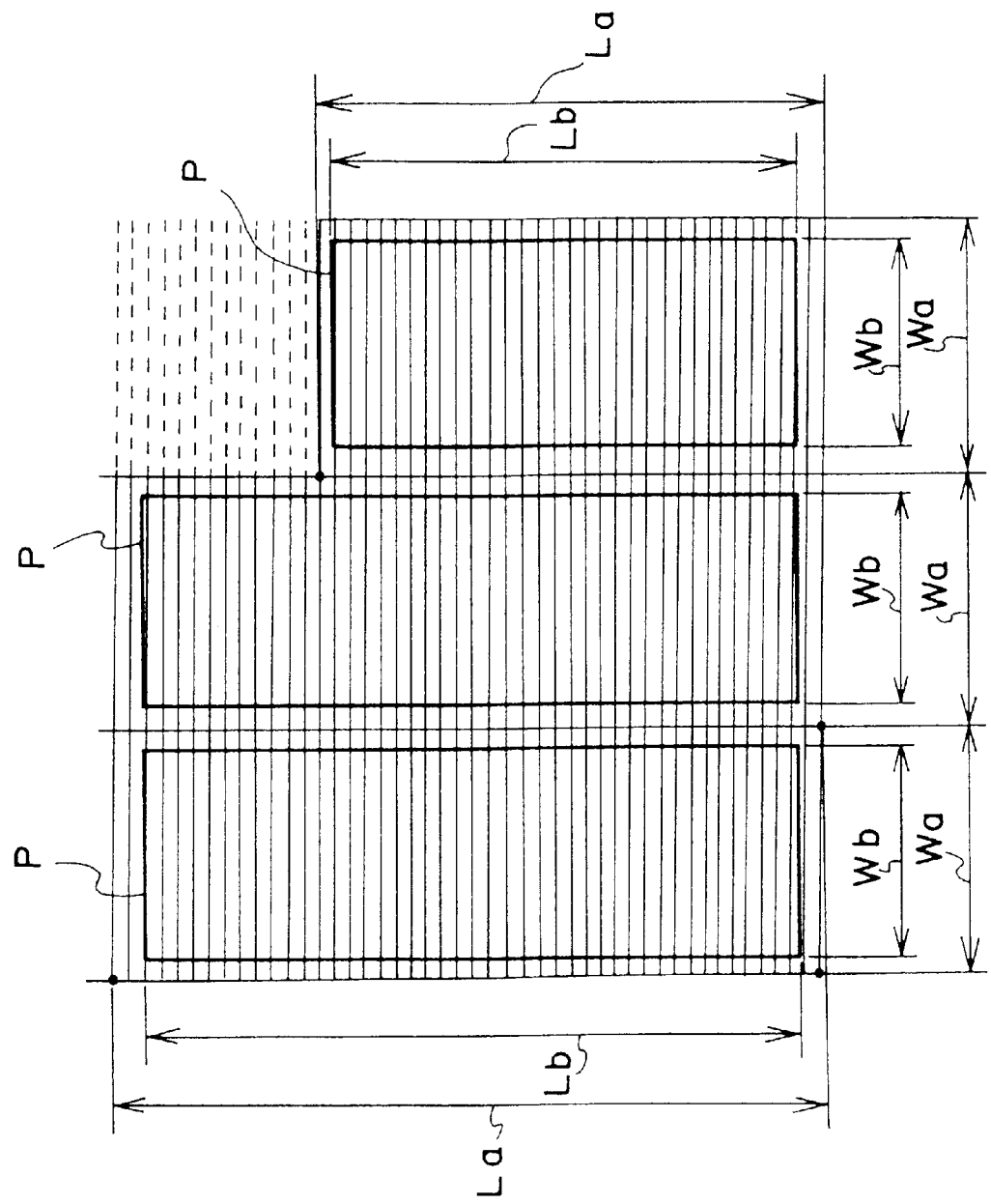
FIG. 20 is a plan view of an exposure section, illustrating the relationship between image information to be exposed and the printing papers.
Figure 21:
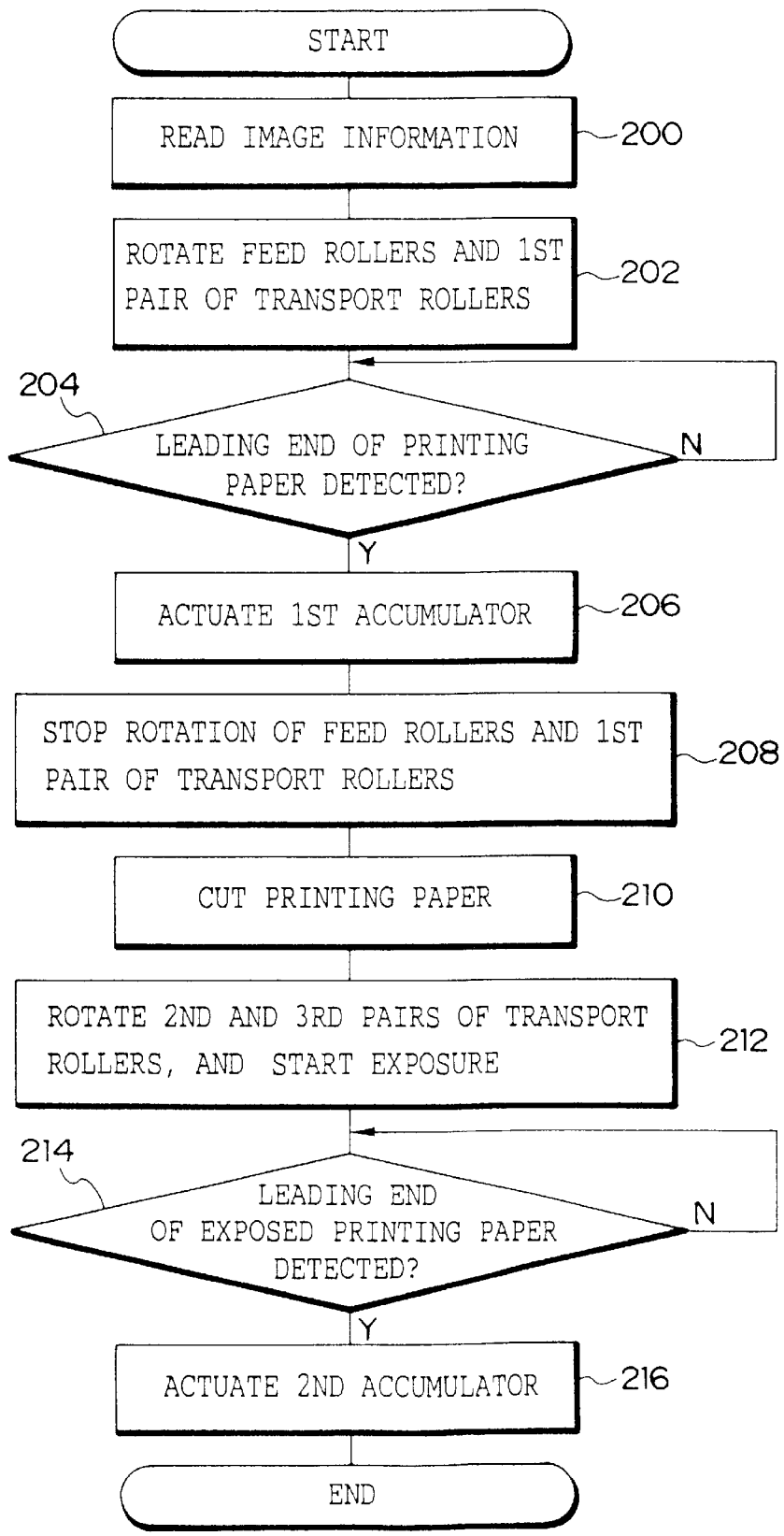
FIG. 21 is flowchart on another kind of control.
Figure 22:
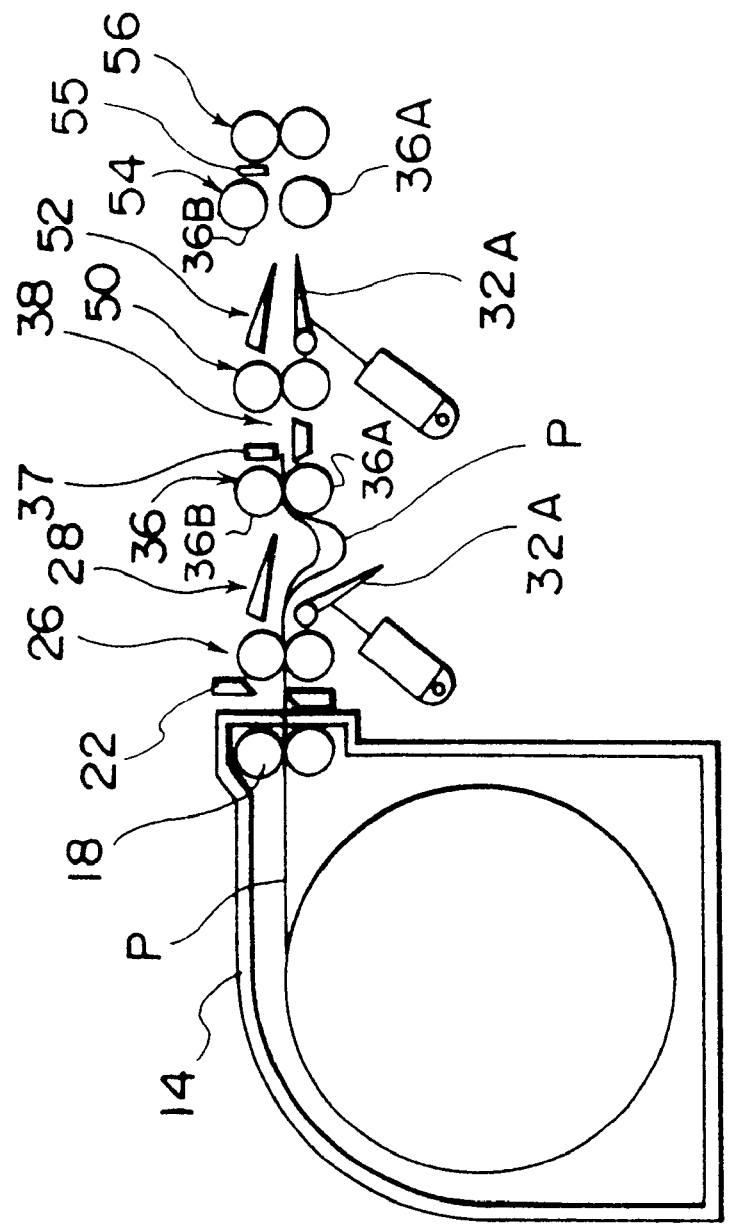
FIG. 22 is a plan view illustrating the transport passage of the printing paper from the magazine accommodating section to the position short of the processor section, and explains a state in which the printing paper has been detected by a sensor.

In this embodiment, as shown in FIG. 20, as for each item of the image information to be exposed, a width Wa thereof is set to be a predetermined dimension larger than the width Wb of the printing paper P, and a length La thereof is set to be a predetermined dimension larger than the length Lb of the printing paper P.

For this reason, even if the position of the printing paper P is slightly offset in the widthwise direction and in the transporting direction, it is possible to prevent a situation in which an unexposed portion (a whitened portion in a finished state) is produced in an edge of the printing paper P, or part of adjacent image information is exposed therein.

Figure 18:
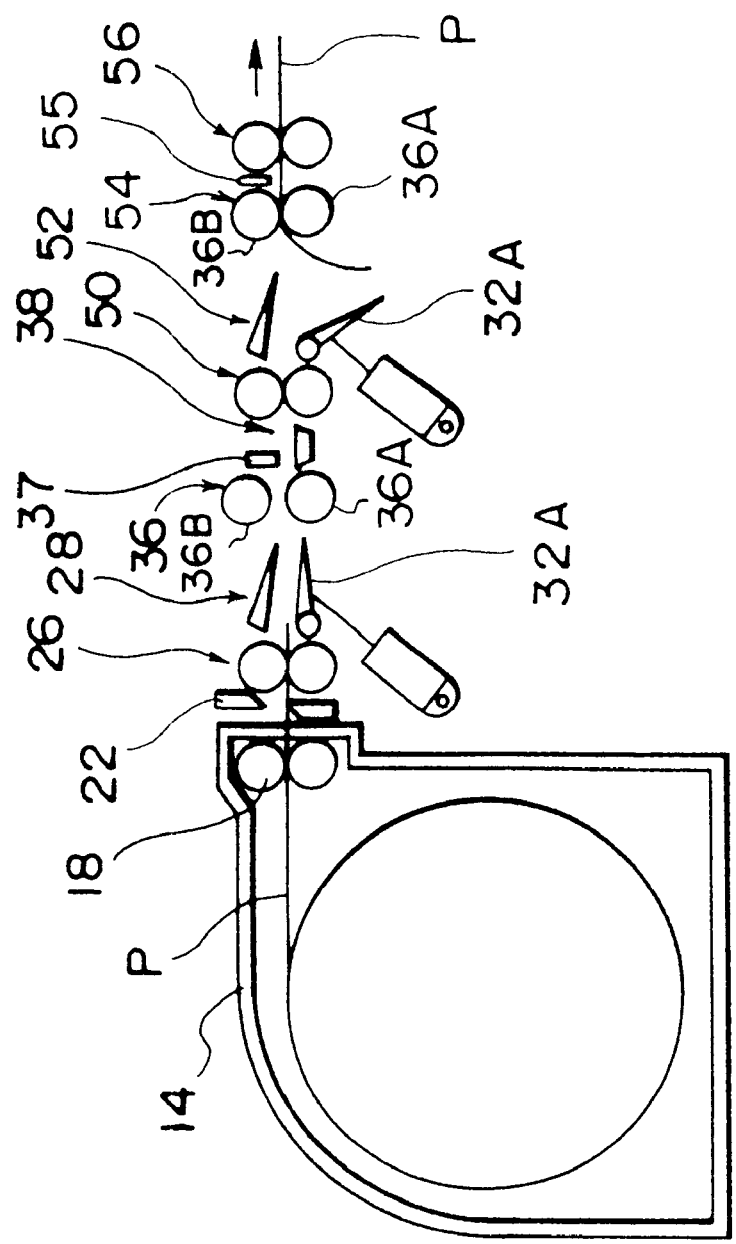
FIG. 18 is a plan view illustrating the transport passage of the printing paper from the magazine accommodating section to the position short of the processor section, and explains a state in which the first accumulator has returned to its original horizontal state.

Incidentally, after the trailing ends of the printing papers P are detected by the sensors 37, the guide members 32A of the first accumulator 28 return to the original horizontal state, and the upper roller 36B of the second pair of transport rollers 36 is raised to be spaced apart from the lower roller 36A (see FIG. 18).

Figure 19:
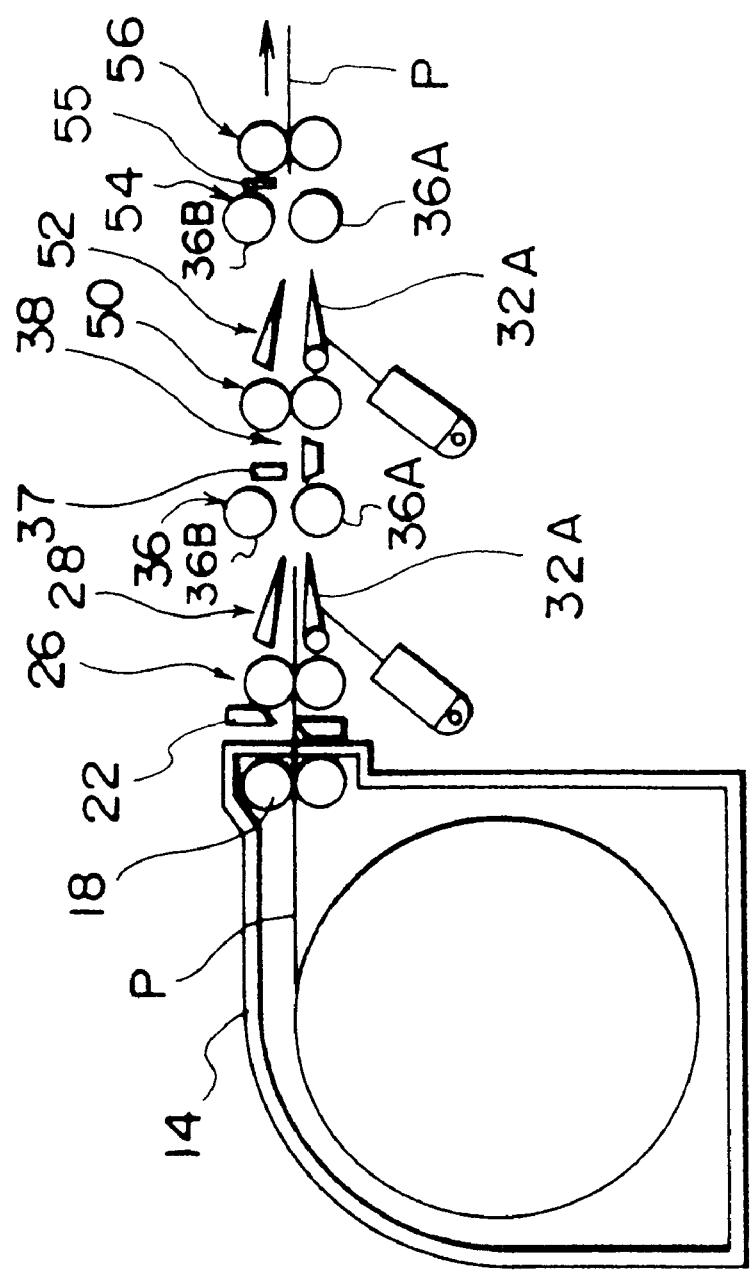
FIG. 19 is a plan view illustrating the transport passage of the printing paper from the magazine accommodating section to the position short of the processor section, and explains a state in which the second accumulator has returned to its original horizontal state.

In addition, after the trailing ends of the printing papers P are detected by the sensors 55, the guide members 32A of the second accumulator 52 return to the original horizontal state, and the upper roller 36B of the fourth pair of transport rollers 54 is raised to be spaced apart from the lower roller 36A (see FIG. 19).

The printing papers P transported to the processor section 60 are subjected to development, fixation, washing, and dry processing in three rows as shown in FIG. 10, are then discharged from the processor section 60, and are allowed to drop onto the belt conveyor 82.

In this embodiment, the trailing ends of the printing papers P arranged in the widthwise direction are aligned, and the order of frames is sequentially arranged in parallel starting from the downstream side of the belt conveyor 82 in the transporting direction thereof. Hence, the printing papers P are accumulated in the order of frames on the receiving tray 84 in the accumulating portion 86.

Incidentally, when one order portion of printing papers P is accumulated on the tray 84, the receiving tray 84 is moved by one pitch, and an ensuing empty receiving tray 84 is positioned on the discharge side of the belt conveyor 82.

Second Embodiment

Next, referring to the flowchart shown in FIG. 21 and FIGS. 22 to 25, a description will be given of another example of control.

Here, a description will be given of an example in which three magazines 14 are loaded in the same way as in the above-described embodiment, and supply, cutting, scanning exposure, and development processing are carried out by using three rows of printing papers P.

First, the sizes of image information of a one-order portion to be exposed are read by the controller 20 (Step 200).

The feed rollers 18 of each magazine 14 are rotated in correspondence with the size of prints to be exposed. The printing papers P of lengths corresponding to print sizes are fed out from the respective magazines 14 in a parallel state, and are transported by the first pair of transport rollers 26 (Step 202). At this time, the transport rollers 18 of each magazine 14 start feeding the printing papers P in such a manner that the endings of feeding out of the respective printing papers P will occur substantially concurrently.

When the leading ends of the printing papers P in the transporting direction thereof are detected by the sensors 37 (Step 204), the upper roller 36B, which was spaced apart from the lower roller 36A, is lowered, portions in the vicinities of the leading ends of the printing papers P in the transporting direction thereof are nipped by the lower roller 36A and the upper roller 36B, and the guide members 32A of the first accumulator 28 are set in the vertical state (Step 206), thereby opening the lower side of the first accumulator 28. As a result, the printing papers P are curved downward and are accumulated. In this embodiment, the leading ends of the respective printing papers P are aligned in a row immediately below the sensors 37 (see FIG. 22).

Figure 23:
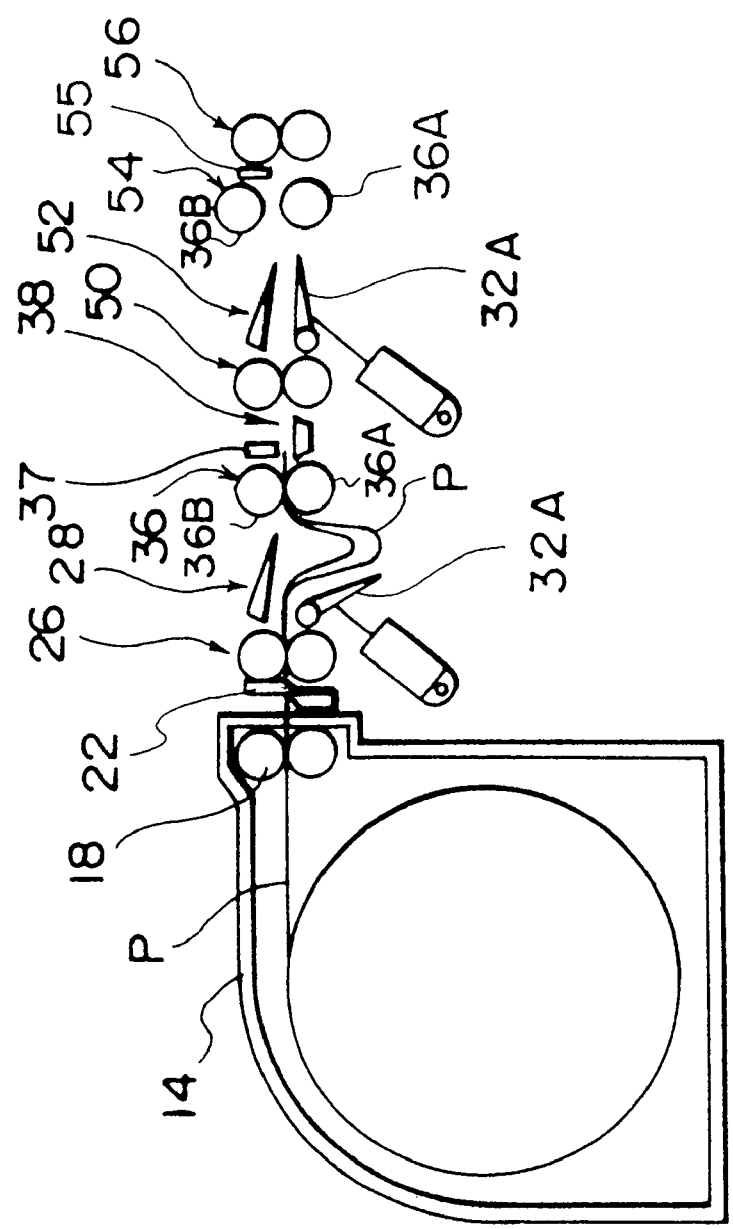
FIG. 23 is a plan view illustrating the transport passage of the printing paper from the magazine accommodating section to the position short of the processor section, and explains a state in which the trailing end of the printing paper has been cut by the cutter.
Figure 24:
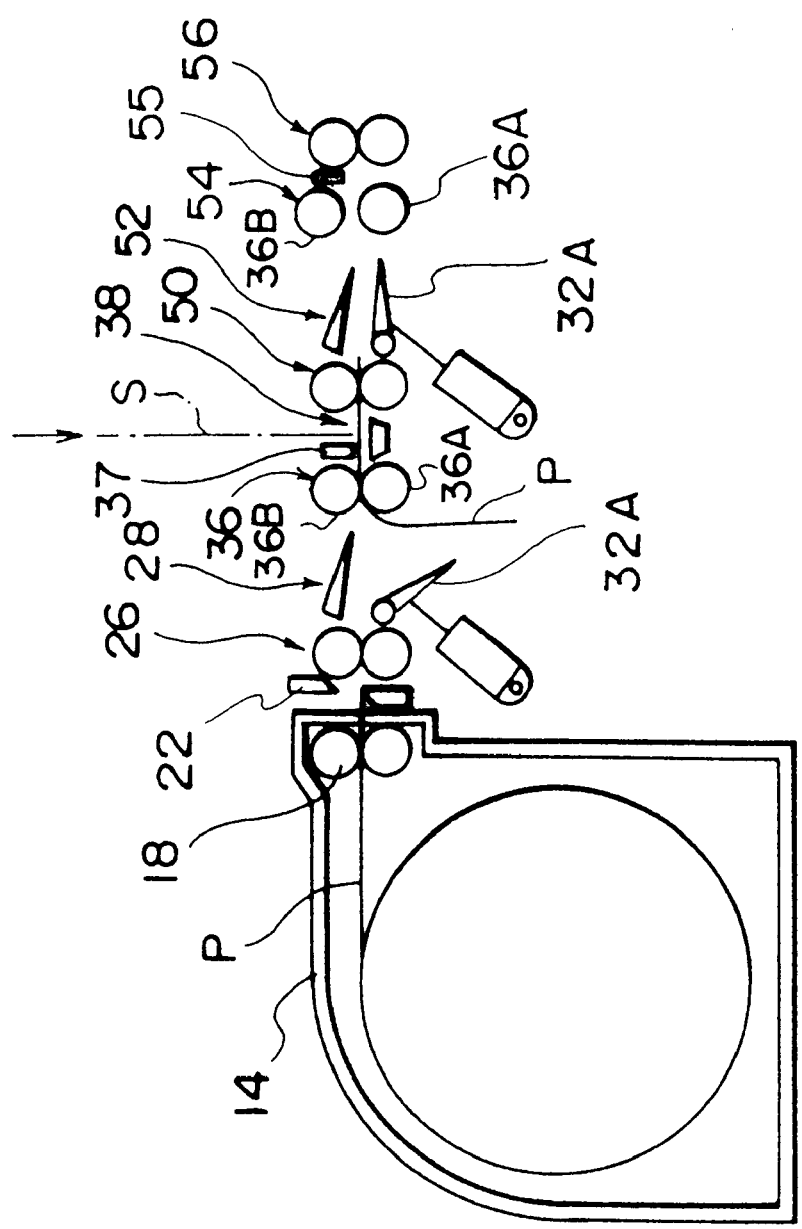
FIG. 24 is a plan view illustrating the transport passage of the printing paper from the magazine accommodating section to the position short of the processor section, and explains a state in which the printing paper has been fed out from the magazine.
Figure 25:
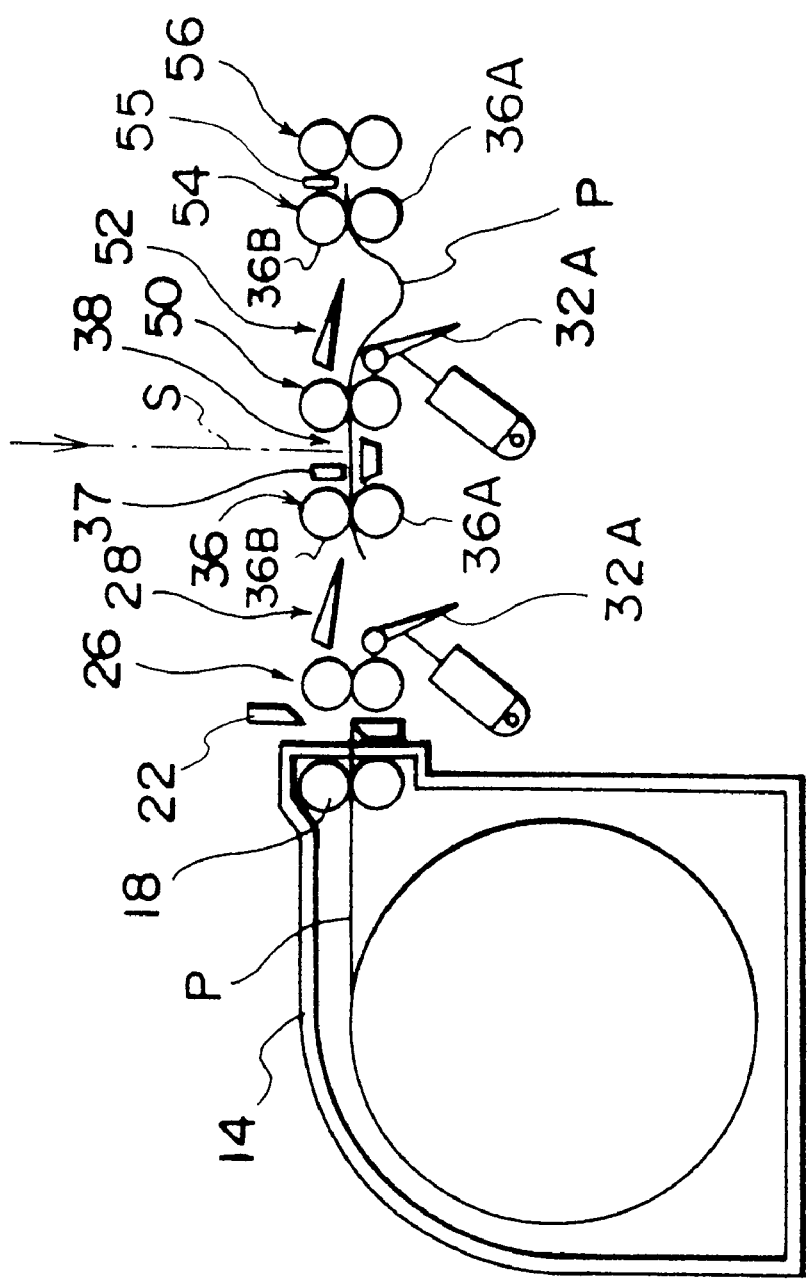
FIG. 25 is a plan view illustrating the transport passage of the printing paper from the magazine accommodating section to the position short of the processor section, and explains a state in which the second accumulator has been operated.

When predetermined amounts of the printing papers P are fed out from the magazines 14, the rotation of the feed rollers 18 of the magazines 14 and the first pair of transport rollers 26 is stopped (Step 208), and the cutter driving device 24 is actuated to cut the three rows of the printing papers P substantially simultaneously (Step 210, s ee FIG. 23). Incidentally, the amounts of the printing papers P accumulated in the first accumulator 28 respectively vary depending on the lengths of the printing papers P.

When the cutting of the printing papers P is completed, the first pair of transport rollers 26, the second pair of transport rollers 36, and the third pair of transport rollers 50 are driven at a predetermined speed. The three rows of the printing papers P which have reached the exposure section 38 are scanned in the widthwise direction by the laser beam S emitted from the scanning exposure system 40, starting from the leading-end side in the transporting direction (Step 212, see FIG. 24).

When the leading ends of the printing papers P being transported are detected by the sensors 55 after passing the second accumulator 52 and the fourth pair of transport rollers 54 (Step 214), the upper roller 36B, which was spaced apart from the lower roller 36A when the printing paper P was at the fourth pair of transport rollers 54, is lowered, so that a portion in the vicinity of the leading end of the printing paper P in the transporting direction thereof is nipped by the lower roller 36A and the upper roller 36B. The printing paper P whose leading end was detected is fed to the processor section 60 by the second pair of transport rollers 36 at a low speed matching the transporting speed in the processor section 60. Concurrently, the guide members 32A of the second accumulator 52 corresponding to the printing paper P detected by the sensor 55 are set in the vertical state. Here, since the transporting speed of the fourth pair of transport rollers 54 is slower than that of the third pair of transport rollers 50, the printing papers P located downstream of the fourth pair of transport rollers 54 are curved downward and are accumulated by the second accumulator 52.

When the exposure of the three rows of printing papers P is completed (or when the rear ends of the printing papers P are discharged from the third pair of transport rollers 50), the feed rollers 18 of the respective magazines 14 are rotated in correspondence with the size of prints to be exposed next. Subsequently, in the same way as described above, the three rows of printing papers P are subjected to supply, cutting, and scanning exposure, and are transported to the processor section.

The printing papers P transported to the processor section 60 are subjected to development, fixation, washing, dry processing, and the like in three rows, and are then discharged from the processor section 60.

Incidentally, after the trailing ends of the printing papers P are detected by the sensors 37, the guide members 32A of the first accumulator 28 return to the original horizontal state, and the upper roller 36B of the second pair of transport rollers 36 is raised to be spaced apart from the lower roller 36A.

In addition, after the trailing ends of the printing papers P are detected by the sensors 55, the guide members 32A of the second accumulator 52 return to the original horizontal state, and the upper roller 36B of the fourth pair of transport rollers 54 is raised to be spaced apart from the lower roller 36A.

The printing papers P discharged from the processor section 60 are transported by the belt conveyor 82, and are accumulated on the tray 84 in the accumulating portion 86.

Figure 26:
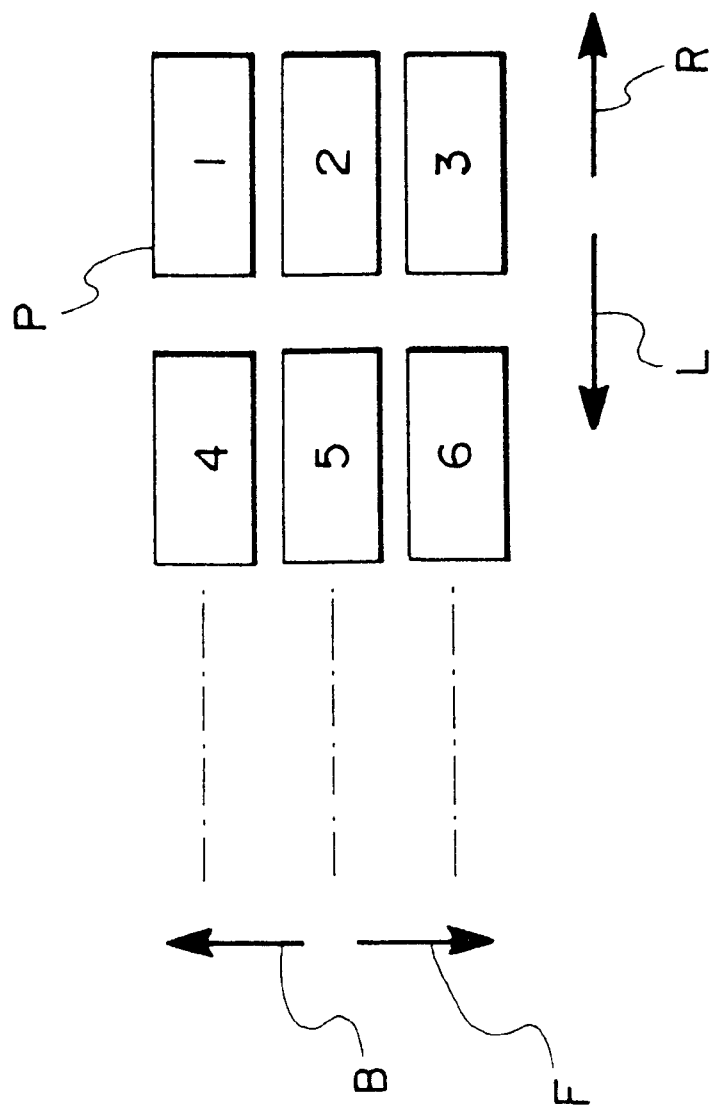
FIG. 26 is a plan view of printing papers illustrating a state in which printing papers of the same size are arranged in three rows.

In this embodiment, since the printing papers P are transported in a state in which their leading ends arranged in the widthwise direction are aligned. Hence, in a case where the sizes of the printing papers P are different, the trailing ends of the printing papers P become nonuniform. Accordingly, in the method of this embodiment, as shown in FIG. 26, the printing papers P are accumulated in the order of frames only in the case where the printing papers P of the same size are transported after being arranged in the widthwise direction.

Although, in the above-described embodiment, a description has been given of an example in which the printing papers P are transported in three rows, it goes without saying that the printing paper P can be transported in one or two rows. In addition, the first pair of transport rollers 26, the second pair of transport rollers 36, the third pair of transport rollers 50, and the fourth pair of transport rollers 54 have their transport passages continuing in the widthwise direction, and the cutter 22 is arranged in such a way as to be able to cut the printing paper P of a maximum width, and is not divided (i.e., is not separately made independent). Hence, even in a case where the wide printing paper P such as the one shown in FIG. 2 is transported, the printing paper P can be transported.

In addition, since the plurality of printing papers P can be supplied independently, the plurality of printing papers P can be cut simultaneously by one cutter 22, and the cutter mechanism can be arranged in a simple manner.

Figure 27:
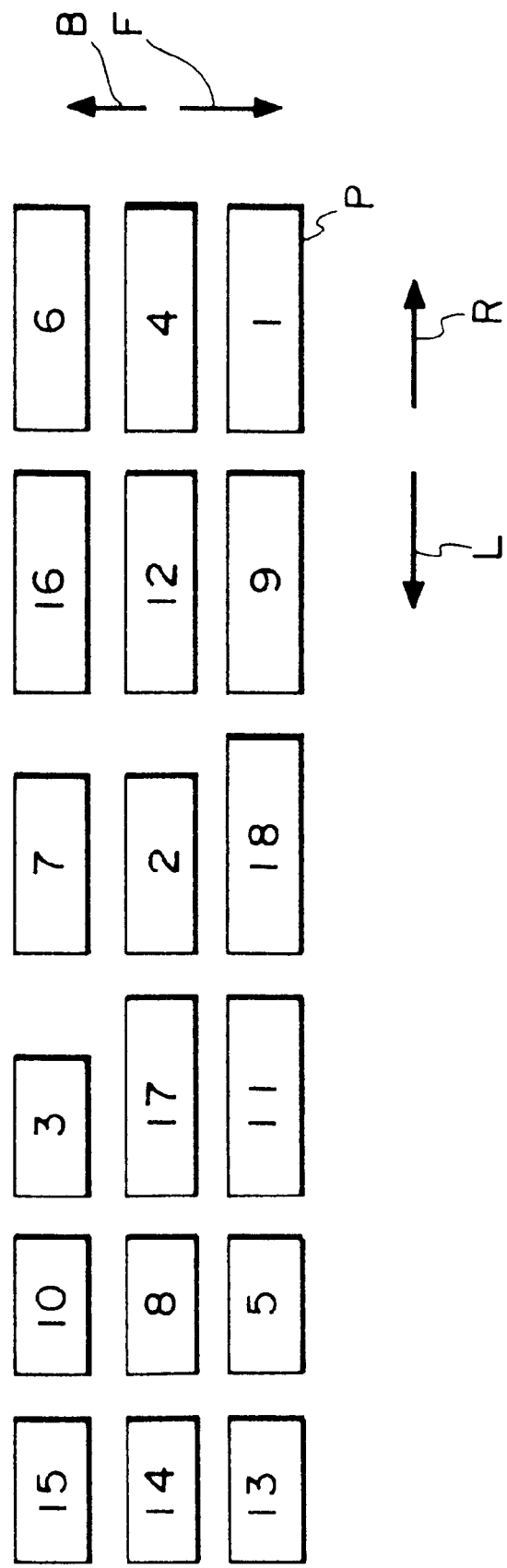
FIG. 27 is a plan view of printing papers illustrating a state in which printing papers of the same size are arranged in the widthwise direction.

Although, in the preceding embodiment, the printing papers P are exposed in the order of frames, if exposure is carried out by grouping together images of the same sizes, as shown in FIG. 27, it is impossible to accumulate the printing papers P in the order of frame numbers, but intervals between the printing papers P in the transporting direction on the whole can be shortened. Hence, it is possible to increase the processing efficiency.

Figure 28:
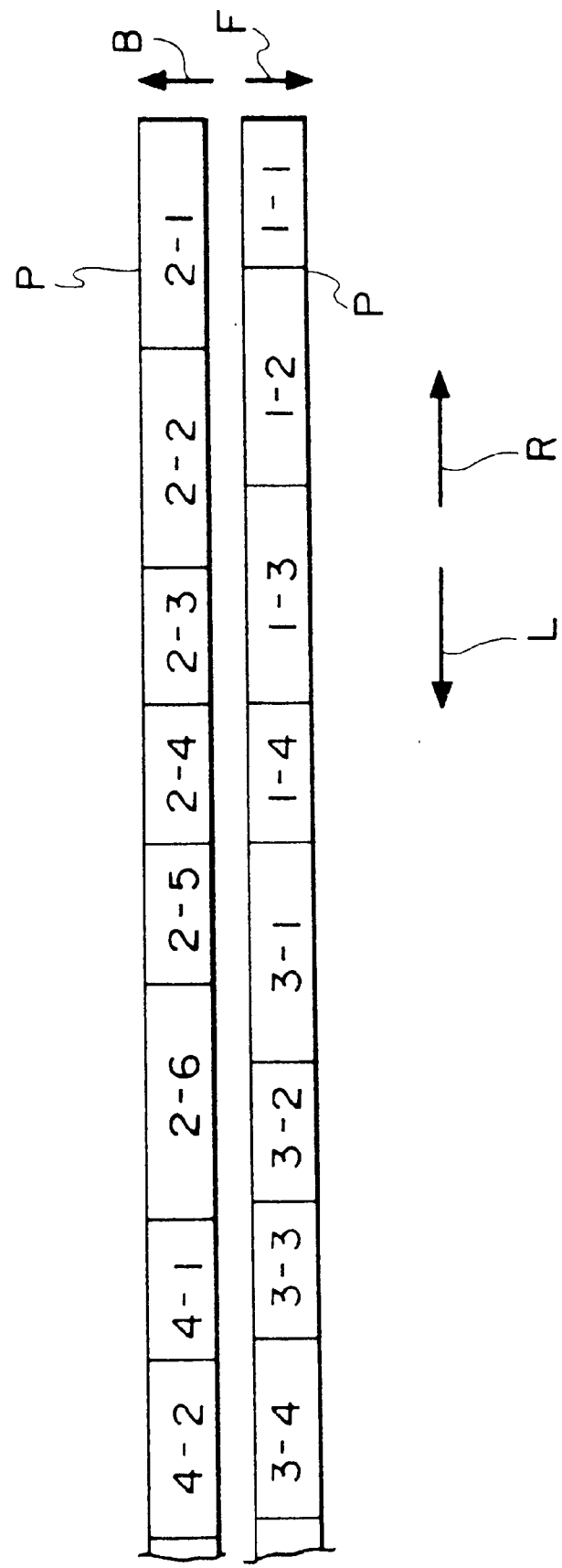
FIG. 28 is a plan view of printing papers illustrating a state in which elongated printing papers are transported.

In addition, although, in the preceding embodiment, cut printing papers P are subjected to exposure, the elongated printing papers P may not be cut, and images may be continuously exposed, as shown in FIG. 28 (as for the numerical figures allotted to the printing papers P in FIG. 28, numerical figures on the left-hand side respectively indicate order numbers, while numerical figures on the right-hand side respectively indicate frame numbers). Incidentally, when images are continuously exposed on the elongated printing papers P, a cut mark is exposed between images and a sort mark is exposed between orders in the conventional manner. In this embodiment, since the cut marks and sort marks are simultaneously printed during exposure of images by the scanning exposure system 40, a conventional auxiliary exposure device for burning in the cut marks and sort marks is not required. For this reason, the structure of the exposure section does not become complex, the cost can be reduced, and reliability can be enhanced. Incidentally, as for the elongated printing papers P after development processing, it suffices if they are cut at the cut marks by reading the cut marks by means of sensors in the conventional manner.

Figure 29:
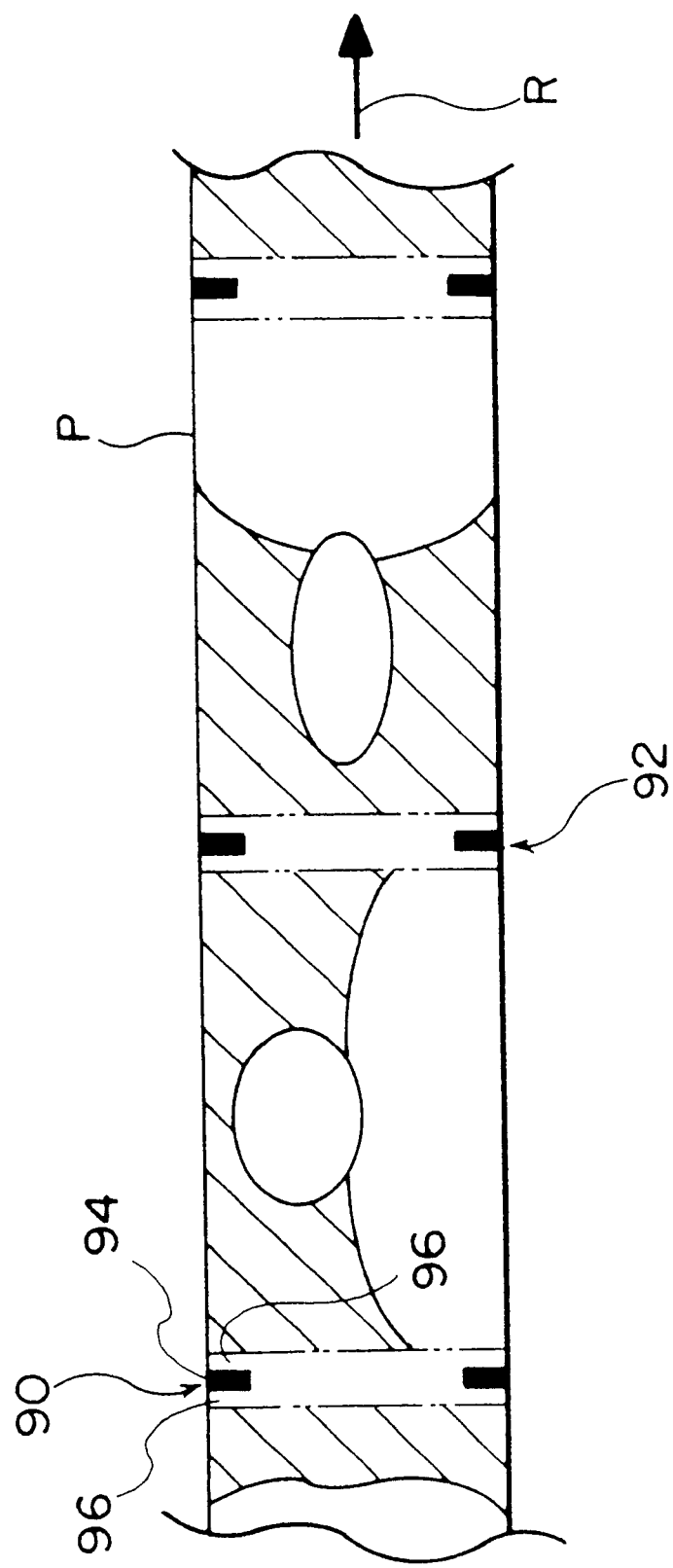
FIG. 29 is a plan view of an elongated printing paper in which cut marks and sort marks have been burned.
Figure 30:
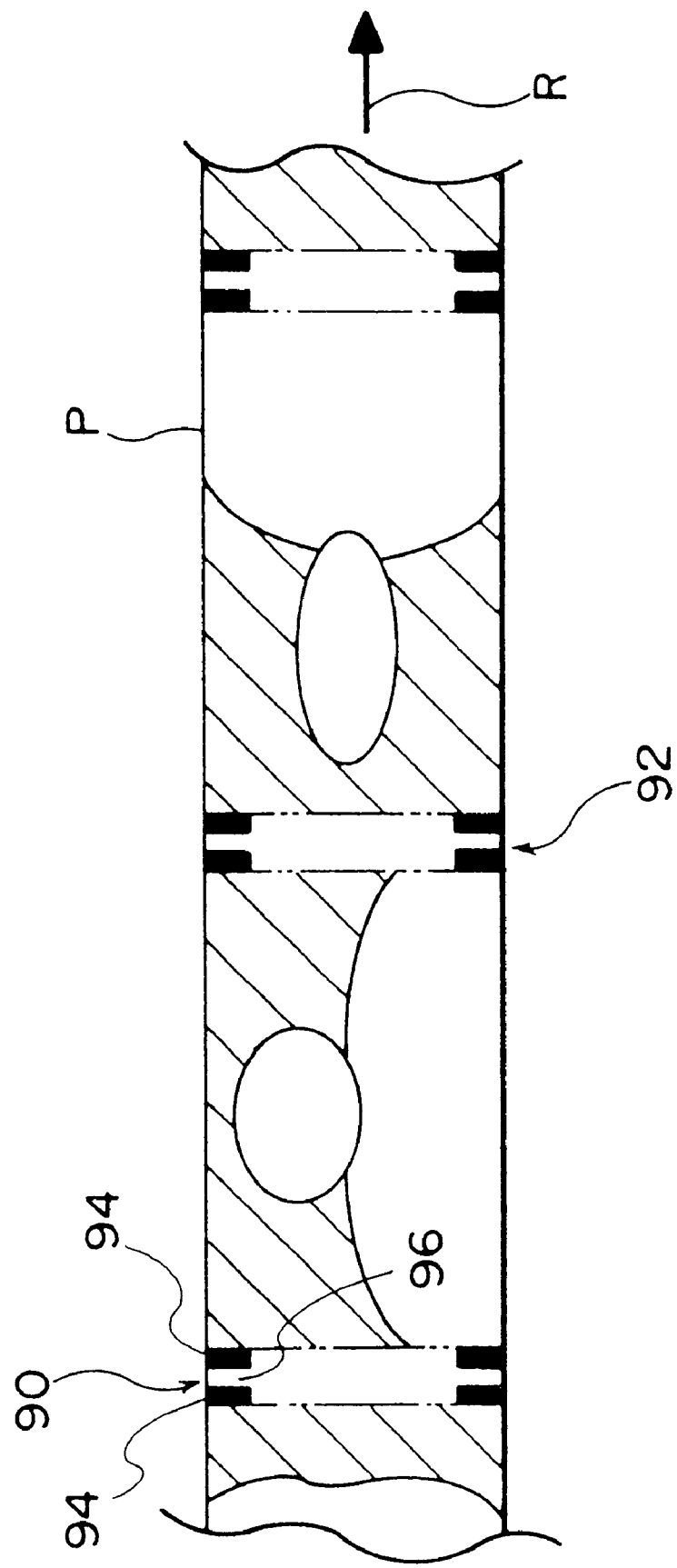
FIG. 30 is a plan view of an elongated printing paper in which cut marks and sort marks of different configurations have been burned.

It should be noted that the cut marks and sort marks may be recorded at a high density between images. To facilitate detection, as shown in FIG. 29, a cut mark 90 and a sort mark 92 may be each arranged such that a high-density portion 94 is sandwiched by low-density portions (unexposed portions) 96. Alternatively, as shown in FIG. 30, the cut mark 90 and the sort mark 92 may be each arranged such that a low-density portion 96 is sandwiched by high-density portions 94.

Figure 31:
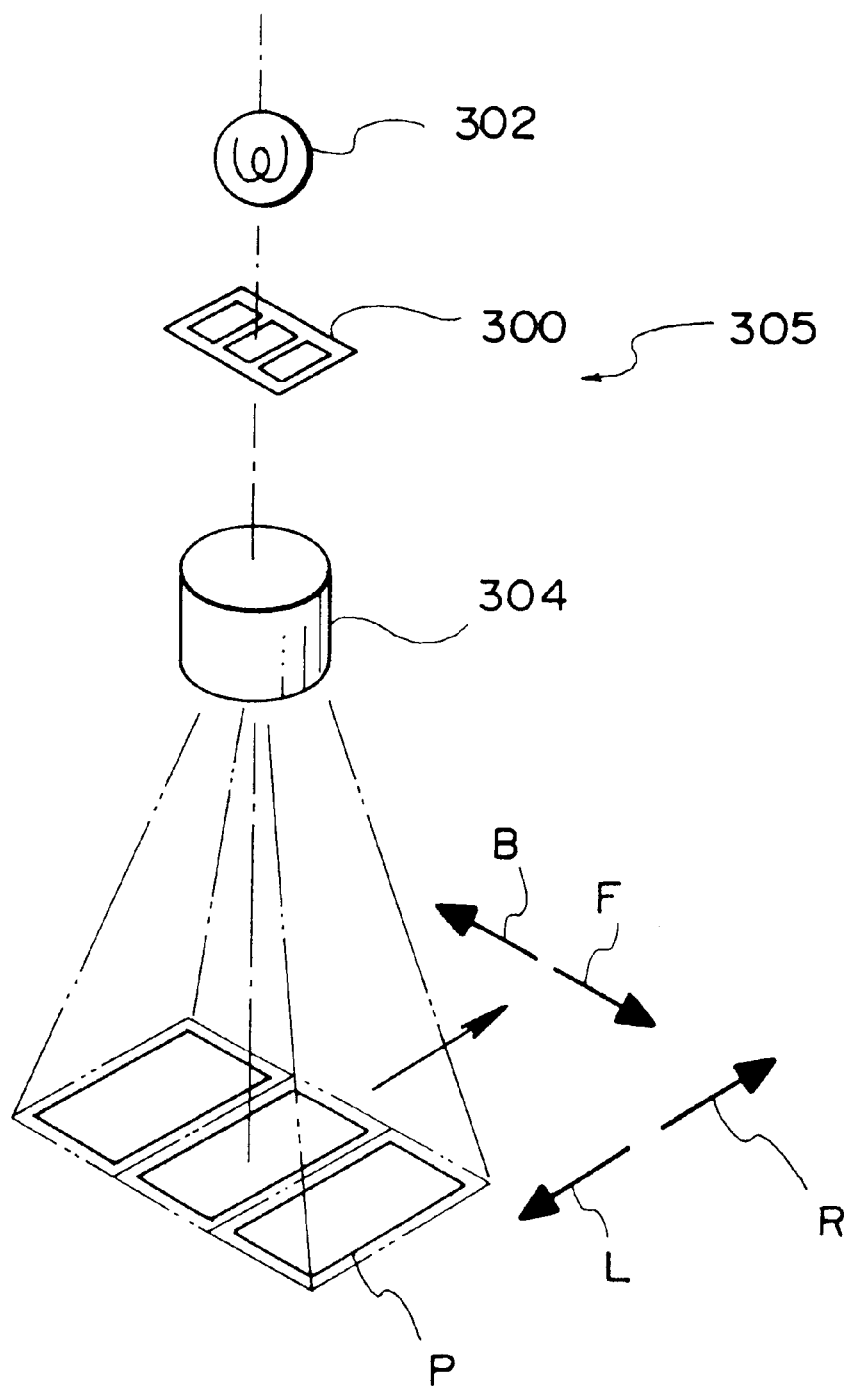
FIG. 31 is a perspective view illustrating an exposure apparatus in accordance with another embodiment.
Figure 32:
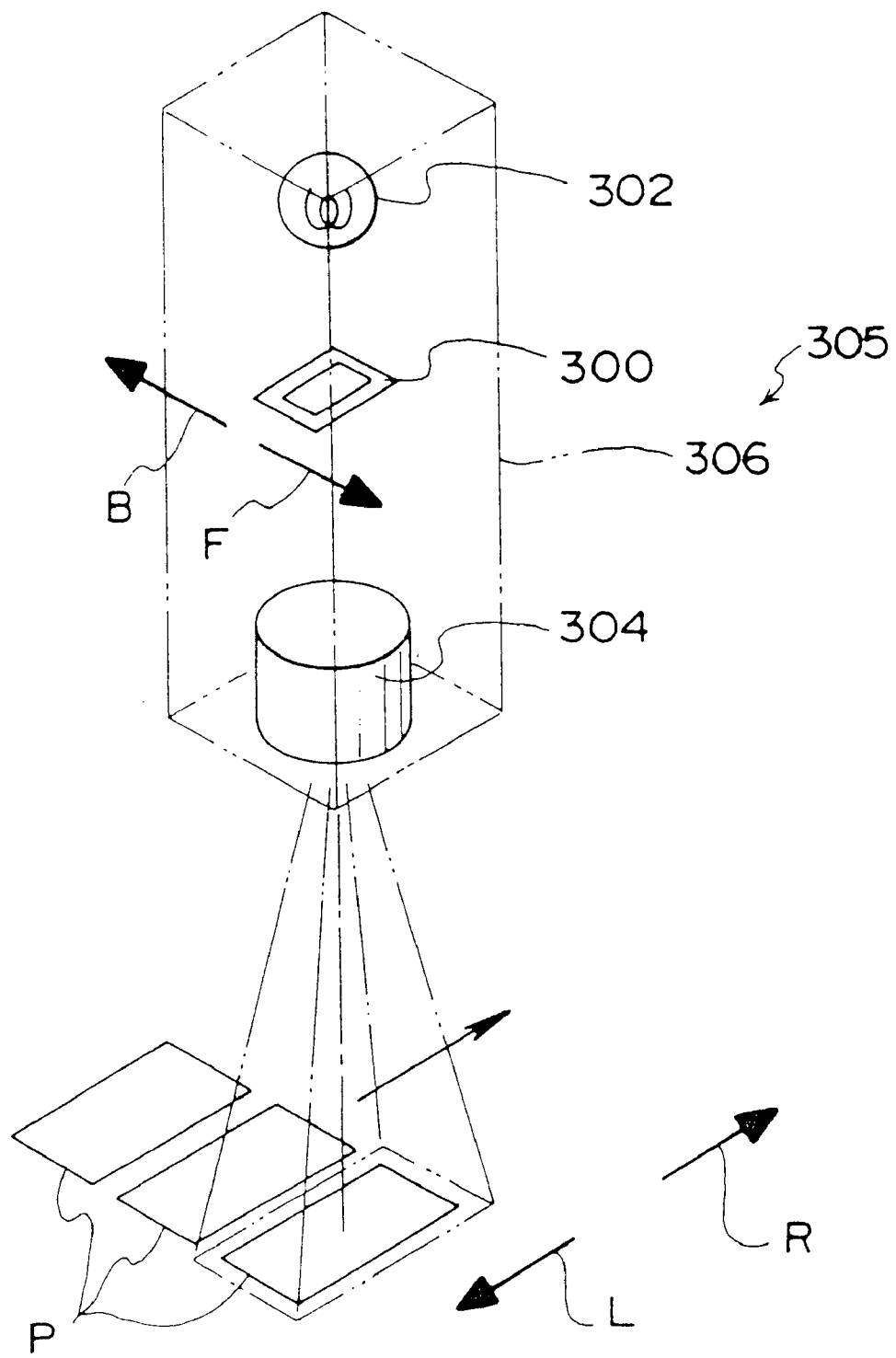
FIG. 32 is a perspective view illustrating an exposure apparatus in accordance with still another embodiment.

Although, in the preceding embodiment, exposure is effected by scanning a laser beam S, as shown in FIG. 31, an exposure system 305 may be provided in which a plurality of images are displayed on a liquid-crystal display plate 300, and light from a light source 302 disposed in the rear of the liquid-crystal display plate 300 is applied to the printing paper P via the liquid-crystal display plate 300, a zoom lens 304, and the like, so as to print the image displayed on the liquid-crystal display plate 300 onto the printing paper P. In this case as well, the size of the image to be printed is set to be a predetermined dimension larger than the size of the printing paper P.

Although, in the preceding embodiment, a plurality of images are simultaneously printed onto a plurality of rows of printing papers P, an arrangement may be provided such that, as shown in FIG. 302, the light source 32, the liquid-crystal display plate 300, and the zoom lens 304 are formed as one unit 306, and images are printed one by one by consecutively moving the unit 306 in the widthwise direction of the printing paper P. In this case, efficiency can be favorably increased if the supply of the printing paper P to and discharge thereof from the exposure section 38 are effected simultaneously, and the timing is changed over for each row.

In addition, instead of using the liquid-crystal display plate 300, it is possible to use a negative film, and projection exposure may be effected directly from the negative film onto the printing paper P. Instead of using the liquid-crystal display plate 300 and the light source 302, it is possible to use a CRT, and an image displayed on the CRT may be projected and exposed onto the printing paper P.

What is claimed is:

1. A method for exposing a photosensitive material, comprising the steps of:

transporting a plurality of photosensitive materials at predetermined intervals in a first direction intersecting a transporting direction by a single transporting means; and exposing the plurality of photosensitive materials supported by said single transporting means in an exposure region by a single exposure system, wherein said single exposure system is capable of exposing each piece of image information to be exposed onto each of said plurality of photosensitive materials to a size larger than at least a length of each of the photosensitive materials in the first direction, and trailing ends of said photosensitive materials having different lengths in the transporting direction are aligned in the first direction.

2. A method for exposing a photosensitive material according to claim 1, wherein said single exposure system is a single scanning exposure system for a main scanning direction in the first direction, and in the exposure step said plurality of photosensitive materials are exposed by said single scanning exposure system which is capable of exposing with a range larger than a range including all the plurality of photosensitive materials in the first direction.

3. A method for exposing a photosensitive material according to claim 1, wherein the first direction is a direction substantially perpendicular to the transporting direction, and all the plurality of photosensitive materials have identical lengths in the transporting direction, and wherein, in the exposure step, said plurality of photosensitive materials are exposed collectively.

4. A method for exposing a photosensitive material according to claim 1, wherein the plurality of photosensitive materials are elongated photosensitive materials onto which the plurality of pieces of image information are exposed along the transporting direction.

5. A method for exposing a photosensitive material according to claim 1, wherein each of the plurality of photosensitive materials arranged in rows includes a plurality of second photosensitive materials which are spaced apart from each other, and the plurality of photosensitive materials are transported such that while one photosensitive material among the plurality of photosensitive materials in one row is being exposed in the exposure region, the supply to the exposure region and/or the discharge from the exposure region of at least one photosensitive material among the plurality of photosensitive materials in another row is effected.

6. An apparatus for exposing a photosensitive material, comprising:

single transporting means capable of transporting a plurality of photosensitive materials at predetermined intervals in parallel in a first direction intersecting a transporting direction;

a single exposure system for exposing in an exposure region the plurality of photosensitive materials supported by said single transporting means, said single exposure system being capable of setting a size of each piece of image information to be exposed to a size larger than a size of each of the plurality of photosensitive materials;

wherein trailing ends of said photosensitive materials having different lengths in the transporting direction are aligned in the first direction.

7. An apparatus for exposing a photosensitive material according to claim 6, wherein said single exposure system is a single scanning exposure system.

8. An apparatus for exposing a photosensitive material according to claim 6, wherein said transporting means is provided with an accumulator having a plurality of guide means which are disposed along transport passages of the plurality of photosensitive materials, said plurality of guide means being capable of being independently operated, respectively, and of making lengths of the transporting passages of the photosensitive materials variable.

9. An apparatus for exposing a photosensitive material according to claim 7, wherein said transporting means is provided with an accumulator having a plurality of guide means which are disposed along transport passages of the plurality of photosensitive materials, said plurality of guide means being capable of being independently operated, respectively, and of making lengths of the transporting passages of the photosensitive materials variable.

10. An apparatus for exposing a photosensitive material according to claim 7, wherein said scanning exposure system is arranged such that a scanning exposure range in a direction substantially perpendicular to a transporting direction of the photosensitive material covers the plurality of photosensitive materials which are transported in parallel.

11. An apparatus for exposing a photosensitive material according to claim 9, wherein said scanning exposure system is arranged such that a scanning exposure range in a direction substantially perpendicular to a transporting direction of the photosensitive material covers the plurality of photosensitive materials which are transported in parallel.

12. An apparatus for exposing a photosensitive material according to claim 6, wherein each of the plurality of photosensitive materials arranged in rows includes a plurality of photosensitive materials, and the plurality of photosensitive materials are supported and transported by said transporting means such that while one photosensitive material among the plurality of photosensitive materials in one row is being exposed, the supply to the exposure region and/or the discharge from the exposure region of a photosensitive material, located in a vicinity of the one photosensitive material, among the plurality of photosensitive materials in another row is effected.

13. A printer processor comprising:

single transporting means capable of transporting a plurality of photosensitive materials in a first direction intersecting a transporting direction at predetermined intervals in parallel;

a single exposure system for exposing the plurality of photosensitive materials supported by said single transporting means, said single exposure system being capable of setting a size of each piece of image information to be exposed to a size larger than a size of each of the plurality of photosensitive materials;

wherein trailing ends of said photosensitive materials having different lengths in the transporting direction are aligned in the first direction;

a processing section for processing the exposed plurality of photosensitive materials while transporting the exposed plurality of photosensitive materials; and a sorter for receiving the plurality of photosensitive materials discharged from said processing section, and for accumulating the photosensitive materials after transporting the plurality of photosensitive materials in a direction intersecting a transporting direction in said processing section, wherein said single exposure system exposes the plurality of photosensitive materials such that the photosensitive materials are arranged in an order of frame, starting from a downstream side of said sorter as viewed in a transporting direction of the photosensitive materials.

* * * * *